US010954941B2

(12) United States Patent
Miyatake

(10) Patent No.: US 10,954,941 B2
(45) Date of Patent: Mar. 23, 2021

(54) OIL-FREE SCREW COMPRESSOR

(71) Applicant: Kabushiki Kaisha Kobe Seiko Sho (Kobe Steel, Ltd.), Hyogo (JP)

(72) Inventor: Toshiyuki Miyatake, Hyogo (JP)

(73) Assignee: Kobe Steel, Ltd., Hyogo (JP)

( * ) Notice: Subject to any disclaimer, the term of this patent is extended or adjusted under 35 U.S.C. 154(b) by 259 days.

(21) Appl. No.: 16/087,510

(22) PCT Filed: Mar. 21, 2017

(86) PCT No.: PCT/JP2017/011140
§ 371 (c)(1),
(2) Date: Sep. 21, 2018

(87) PCT Pub. No.: WO2017/164153
PCT Pub. Date: Sep. 28, 2017

(65) Prior Publication Data
US 2019/0107109 A1 Apr. 11, 2019

(30) Foreign Application Priority Data
Mar. 25, 2016 (JP) .............................. JP2016-061584

(51) Int. Cl.
*F04C 18/16* (2006.01)
*F04C 27/00* (2006.01)
(Continued)

(52) U.S. Cl.
CPC ............ *F04C 27/009* (2013.01); *F04C 18/16* (2013.01); *F04C 27/00* (2013.01); *F04C 27/005* (2013.01); *F16J 15/34* (2013.01)

(58) Field of Classification Search
CPC ...... F04C 27/00; F04C 27/005; F04C 27/009; F04C 27/02; F04C 18/16; F04C 2220/12;
(Continued)

(56) References Cited

U.S. PATENT DOCUMENTS 4,487,563 A * 12/1984 Mori et al. .............. F04C 18/16
9,068,571 B2 * 6/2015 Hilaris et al. ......... F04C 27/009
(Continued)

FOREIGN PATENT DOCUMENTS

CN 101158355 A 4/2008
JP S61-144289 U 9/1986
(Continued)

OTHER PUBLICATIONS

Notification of Transmittal of Translation of the International Preliminary Report on Patentability and Translation of Written Opinion of the International Searching Authority; PCT/JP2017/011140; dated Oct. 4, 2018.
(Continued)

*Primary Examiner* — Theresa Trieu
(74) *Attorney, Agent, or Firm* — Studebaker & Brackett PC

(57) ABSTRACT

The oil-free screw compressor includes: a screw rotor including a screw and a shaft; a bearing; a first shaft seal device disposed between the screw and the bearing, the first shaft seal device including: a first seal and a first communication section; a second shaft seal device disposed between the first shaft seal device and the bearing, the second shaft seal device including: a second seal and a second communication section; and a first seal member including a seal between the first communication section and the second communication section. The casing includes an atmosphere communication section configured to communicate the first communication section and the second communication section with an atmosphere. A sectional area in the first communication section is larger than a sectional area between the seal of the first seal member and the shaft.

11 Claims, 16 Drawing Sheets

(51) Int. Cl.
*F03C 2/00* (2006.01)
*F03C 4/00* (2006.01)
*F16J 15/34* (2006.01)

(58) Field of Classification Search
CPC .............. F04C 2230/21; F04C 2240/30; F04C 2240/50; F04C 2240/60; F04B 39/00; F16J 15/34; F16J 15/40; F16J 15/441; F16J 15/00
See application file for complete search history.

(56) References Cited

U.S. PATENT DOCUMENTS

| | | | |
|---|---|---|---|
| 10,138,889 B2 * | 11/2018 | Yano et al. | ............ F04C 27/009 |
| 10,309,402 B2 * | 6/2019 | Yano et al. | ............ F04C 27/009 |
| 10,359,043 B2 * | 7/2019 | Miyatake | .............. F04C 27/009 |
| 2017/0016446 A1 | 1/2017 | Yano et al. | |
| 2017/0306958 A1 | 10/2017 | Miyatake | |

FOREIGN PATENT DOCUMENTS

| | | |
|---|---|---|
| JP | H02-124289 U | 10/1990 |
| JP | 2002-276574 A | 9/2002 |
| JP | 2005-090371 A | 4/2005 |

OTHER PUBLICATIONS

International Search Report issued in PCT/JP2017/011140, dated Jun. 20, 2017.

* cited by examiner

OIL-FREE SCREW COMPRESSOR

CROSS-REFERENCE TO RELATED APPLICATIONS

This is a national phase application in the United States of International Patent Application No. PCT/JP2017/011140 with an international filing date of Mar. 21, 2017, which claims a priority of Japanese Patent Application No. 2016-061584 filed on Mar. 25, 2016, the contents of which are incorporated herein by reference.

TECHNICAL FIELD

The present invention relates to an oil-free screw compressor.

BACKGROUND ART

Conventionally, an oil-free screw compressor in which lubricating oil is not supplied to between a screw of a male screw rotor and a screw of a female screw rotor, which engage with each other, has been used. In such an oil-free screw compressor, lubricating oil that has been supplied to a bearing supporting a shaft of the screw rotor is prevented from intruding into a rotor chamber accommodating the screw of the screw rotor. In particular, when a negative pressure is generated in the rotor chamber during an unload operation being an operation in a state where suction into the screw compressor is limited, the lubricating oil in the bearing is prevented from intruding into the rotor chamber.

For instance, an oil-free screw compressor described in JP S61-144289 U has tubular-shaped first and second shaft seal devices that are fitted on a shaft of a screw rotor and are disposed between a screw of the screw rotor and a bearing. The first shaft seal device is disposed on the screw side of the screw rotor, and has a seal provided on the inner peripheral face of the first shaft seal device, and a communication section provided on the bearing side with respect to the seal and communicating between the inner peripheral face side and the outer peripheral face side of the first shaft seal device. On the other hand, the second shaft seal device is disposed on the bearing side of the first shaft seal device, and has a seal provided on the inner peripheral face of the second shaft seal device, and a communication section provided on the screw side of the screw rotor with respect to the seal and communicating between the inner peripheral face side and the outer peripheral face side of the second shaft seal device. The communication section of the first shaft seal device communicates with the atmosphere outside of a casing for accommodating the screw rotor via a first atmosphere communication section formed in the casing. On the other hand, the communication section of the second shaft seal device communicates with the atmosphere outside of the casing via a second atmosphere communication section formed in the casing.

By a negative pressure generated in the rotor chamber during the unload operation, the atmosphere outside of the casing flows in from the communication section of the first shaft seal device. However, only with the communication section of the first shaft seal device, a negative pressure may be generated in the seal on the inner peripheral face of the second shaft seal device, and a small amount of lubricating oil may intrude into the rotor chamber. To eliminate the negative pressure generated in the seal for preventing intrusion of the lubricating oil, the atmosphere outside of the casing also flows in from the communication section of the second shaft seal device.

SUMMARY OF THE INVENTION

Problems to be Solved by the Invention

The oil-free screw compressor described in JP S61-144289 U is complicated in configuration in that the first atmosphere communication section and the second atmosphere communication section are formed in the casing, and is thus difficult to manufacture.

In addition, the first atmosphere communication section and the second atmosphere communication section are formed in the casing so as not to interfere with each other by making their positions in the extension direction of the rotation center line of the screw rotor different. Therefore, this limits disposition of the communication section of the first shaft seal device and the communication section of the second shaft seal device, which communicate with the atmosphere communication sections, in such a manner that they are close to each other in the extension direction of the rotation center line of the screw rotor. That is, the distance between the communication section of the first shaft seal device and the communication section of the second shaft seal device inevitably becomes long. Along with this, the distance between the screw and the bearing of the screw rotor inevitably becomes long. In other words, the distance between the two bearings supporting the respective shafts on both sides of the screw inevitably becomes long.

As a result, the screw rotor (in particular, the shaft) is likely to bend. When the screw rotor bends, the performance of the screw compressor such as volumetric efficiency is lowered.

Accordingly, the present invention has an object to provide an oil-free screw compressor which is easy to manufacture and has a configuration in which bending of the screw rotor is prevented.

Means for Solving the Problems

To solve the above technical problems, a first aspect of the present invention provides an oil-free screw compressor including: a screw rotor including a screw and a shaft; a bearing supporting the shaft; a first shaft seal device fitted on the shaft, the first shaft seal device disposed between the screw and the bearing, the first shaft seal device including: a first seal opposite to the shaft, and a first communication section configured to communicate the bearing side with respect to between the shaft and the first seal, and an outer peripheral face of the first shaft seal device; a second shaft seal device fitted on the shaft, the second shaft seal device disposed between the first shaft seal device and the bearing, the second shaft seal device including: a second seal opposite to the shaft, and a second communication section configured to communicate the screw side with respect to between the shaft and the second seal, and an outer peripheral face of the second shaft seal device; a casing including a rotor chamber accommodating the screw, and a shaft accommodation space accommodating the shaft, the bearing, the first shaft seal device, and the second shaft seal device; and a first seal member fitted on the shaft, the first seal member including an annular seal configured to be opposite to the shaft between the first communication section and the second communication section and separate the first communication section and the second communication section. The casing includes an atmosphere communication section connected to both of the first communication section and the second communication section on the inner peripheral face of the shaft accommodation space, the atmosphere communication section configured to communicate the first communication section and the second communication section with an atmosphere. A flow passage sectional area in the first communication section is larger than a flow passage sectional area between the seal of the first seal member and the shaft.

As compared with a case that the atmosphere communication section for communicating the first communication section of the first shaft seal device with the atmosphere and the atmosphere communication section for communicating the second communication section of the second shaft seal device with the atmosphere are formed in the casing, that is, as compared with a case that two atmosphere communication sections are formed in the casing, the casing is simple in configuration, whereby the oil-free screw compressor is easy to manufacture.

In addition, both of the first communication section of the first shaft seal device and the second communication section of the second shaft seal device communicate with the atmosphere via one atmosphere communication section. Thus, as compared with a case that the atmosphere communication section for communicating the first communication section of the first shaft seal device with the atmosphere and the atmosphere communication section for communicating the second communication section of the second shaft seal device with the atmosphere are formed in the casing, the distance between the first communication section and the second communication section can be short. With this, the distance between the screw rotor and the bearing can also be short. As a result, bending of the screw rotor can be prevented.

Furthermore, since the flow passage sectional area of the first communication section is larger than the flow passage sectional area between the seal of the first seal member and the shaft of the screw rotor, the atmosphere flowing in from the outside via the atmosphere communication section flows into the first communication section of the first shaft seal device. This prevents the atmosphere from entering the second communication section of the second shaft seal device to pass between the seal of the first seal member and the shaft toward the rotor chamber. As a result, generation of negative pressure between the seal of the second shaft seal device and the shaft can be prevented, whereby it is prevented that the lubricating oil of the bearing is attracted between the seal of the second shaft seal device and the shaft by the negative pressure and the attracted lubricating oil finally intrudes into the rotor chamber.

Effect of the Invention

The oil-free screw compressor of the present invention is easy to manufacture, and prevents bending of the screw rotor.

BRIEF DESCRIPTION OF THE DRAWINGS

These aspects and features of the present invention will be apparent from the following description in connection with preferred embodiments with reference to the accompanying drawings. In these drawings.

MODE FOR CARRYING OUT THE INVENTION

In the following, embodiments will be described in detail with reference to the drawings as appropriate. However, a detailed description more than necessary may be omitted. For example, a detailed description of already well-known matters and an overlapping description for substantially the same configuration may be omitted. This is to avoid the unnecessary redundancy of the following description and to facilitate understanding by those skilled in the art.

It should be noted that the inventor(s) provides (provide) the drawings and the following description for a person skilled in the art to fully understand the embodiments. Thus, the drawings and the description are not intended to limit the subject matter defined in the claims.

Hereinafter, embodiments of the present invention will be described with reference to the drawings.

Figure 1:
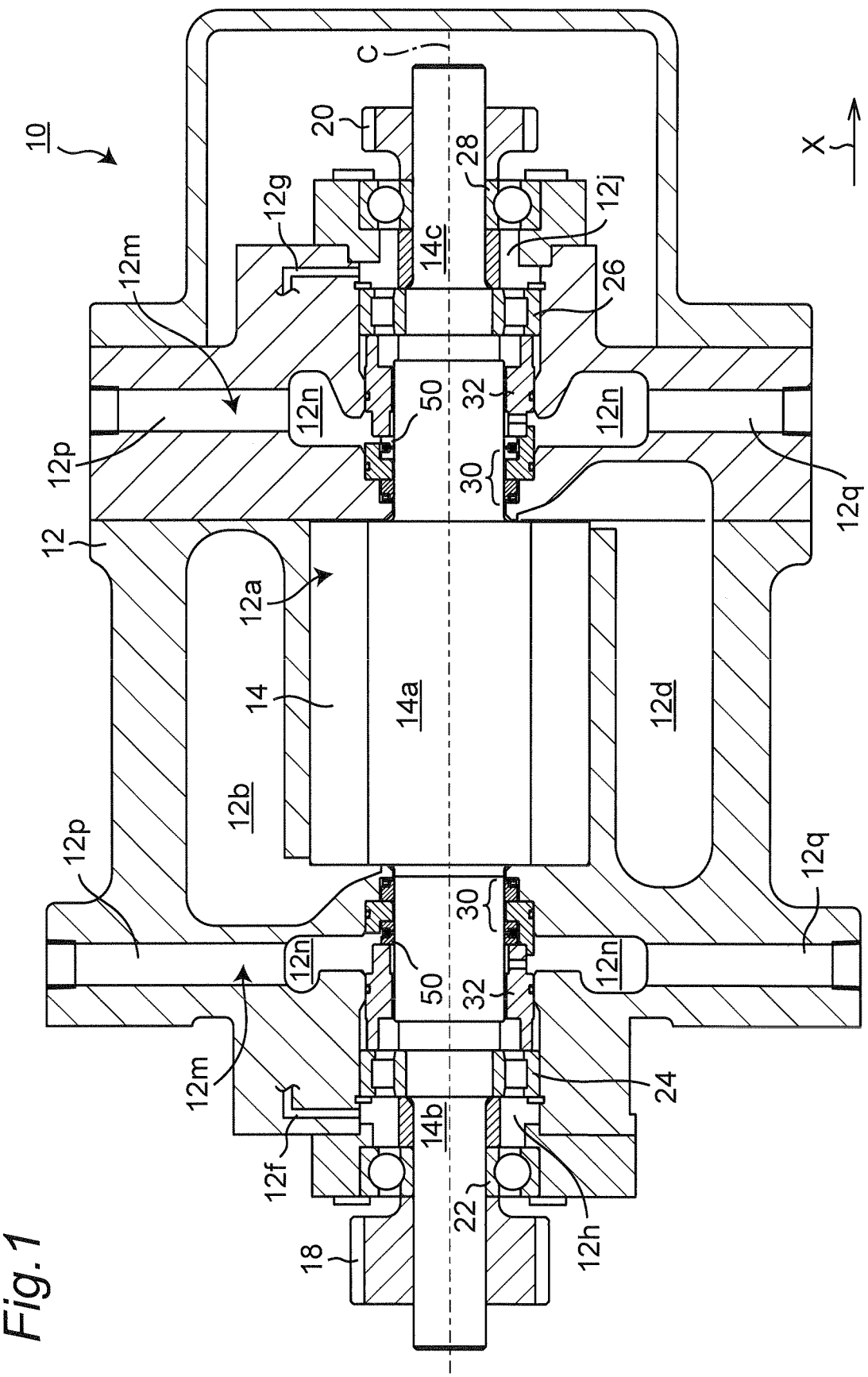
FIG. 1 is a schematic sectional view illustrating the interior of an oil-free screw compressor according to an embodiment of the present invention.
Figure 2:
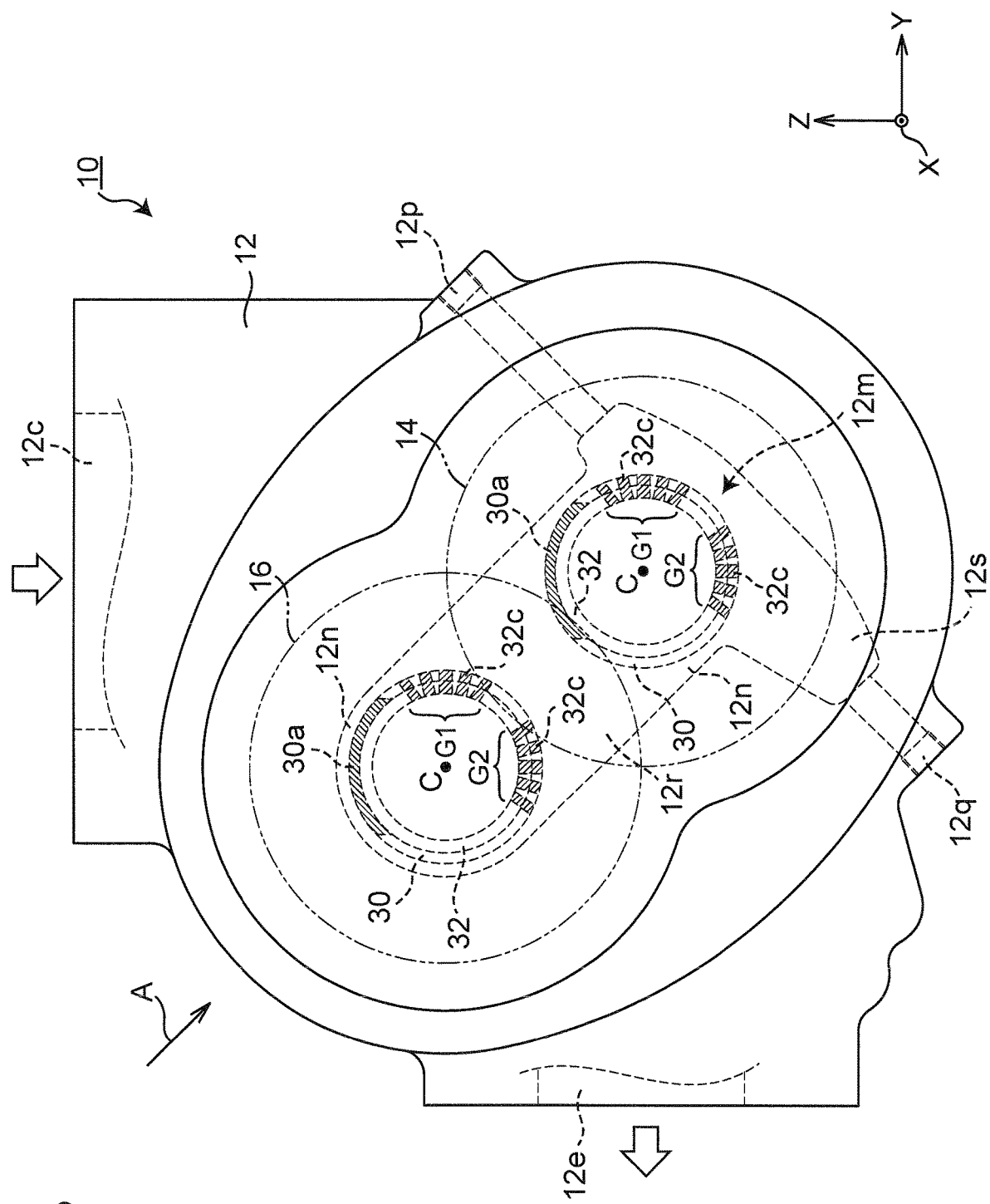
FIG. 2 is a schematic front view of the oil-free screw compressor as seen in the extension direction of the rotation center line of a screw rotor.

FIG. 1 is a schematic sectional view illustrating the interior of an oil-free screw compressor (hereinafter, referred to as a "screw compressor") according to an embodiment of the present invention. FIG. 2 is a schematic front view of a screw compressor 10 as seen in the extension direction (X-axis direction) of the rotation center line of a screw rotor of the screw compressor, and illustrates disposition of some components. It should be noted that FIG. 1 is a cross-sectional view of the screw compressor as seen in the direction indicated by arrow A in FIG. 2.

As illustrated in FIGS. 1 and 2, the screw compressor 10 includes a casing 12. In addition, the screw compressor 10 also includes a male screw rotor 14 (screw rotor) and a female screw rotor 16 (screw rotor) accommodated in the casing 12.

It should be noted that portions of the male screw rotor 14 and the female screw rotor 16 except for their screws meshing with each other in a state where they are not in contact with each other are substantially the same. Therefore, hereinafter, the male screw rotor 14 will be mainly described, and the description of the female screw rotor 16 will be omitted.

As illustrated in FIG. 1, the male screw rotor 14 includes a screw 14a, and shafts 14b and 14c provided at both ends of the screw 14a (at both ends in the extension direction of rotation center line C thereof).

The screw 14a of the male screw rotor 14 is accommodated in a rotor chamber 12a of the casing 12 together with a screw of the female screw rotor 16 (not shown). The rotor chamber 12a communicates with a suction port 12c formed in the outer face of the casing 12 via a suctioning flow passage 12b formed in the casing 12 in order to suck air thereinto. The rotor chamber 12a also communicates with a discharge port 12e via a discharging flow passage 12d in order to discharge air compressed by the male screw rotor 14 and the female screw rotor 16 to the outside of the casing 12.

On the tip side of one shaft 14b of the male screw rotor 14 (on the left side in FIG. 1), a drive gear 18 is mounted. The drive gear 18 is rotatably driven by a motor (not shown).

On the tip side of another shaft 14c of the male screw rotor 14 (on the right side in FIG. 1), a timing gear 20 is mounted. A timing gear meshing with the timing gear 20 (not shown) is mounted on a shaft of the female screw rotor 16 (not shown) extending in parallel with the shaft 14c of the male screw rotor 14.

In addition, the male screw rotor 14 is rotatably supported by a plurality of bearings 22, 24, 26, and 28. In the present embodiment, the ball bearing 22 is disposed on the tip side of the shaft 14b, the ball bearing 28 is disposed on the tip side of the shaft 14c, and the roller bearings 24 and 26 are disposed on the screw 14a side.

In the casing 12, formed are a lubricating flow passage 12f for supplying lubricating oil to the bearings 22 and 24 and a lubricating flow passage 12g for supplying lubricating oil to the bearings 26 and 28. Specifically, in the casing 12, formed are a shaft accommodation space 12h accommodating the shaft 14b of the male screw rotor 14 and the bearings 22 and 24 and a shaft accommodation space 12j accommodating the shaft 14c of the male screw rotor 14 and the bearings 26 and 28. The lubricating flow passage 12f is formed in the casing 12 so as to supply lubricating oil into the portion of the shaft accommodation space 12h between the bearings 22 and 24 fitted on the shaft 14b. In addition, the lubricating flow passage 12g is formed in the casing 12 so as to supply lubricating oil into the portion of the shaft accommodation space 12j between the bearings 26 and 28 fitted on the shaft 14c. It should be noted that the lubricating flow passages 12f and 12g are connected to a discharge port of an oil pump for discharging lubricating oil (not shown).

When the drive gear 18 is rotated by the motor (not illustrated), the male screw rotor 14 rotates, and the female screw rotor 16 rotates via the timing gear 20. This sucks air via the suction port 12c into the rotor chamber 12a, and the sucked air is then compressed by the male screw rotor 14 and the female screw rotor 16, which rotate synchronously. The compressed air is discharged to the outside of the casing 12 via the discharge port 12e.

In the screw compressor 10, the compressed air in the rotor chamber 12a is prevented from leaking to the outside (shaft accommodation spaces 12h and 12j), and the lubricating oil in the plurality of bearings 22, 24, 26, and 28 is prevented from intruding into the rotor chamber 12a. Specifically, as illustrated in FIG. 1, the screw compressor 10 has first shaft seal devices 30 for preventing leakage of the compressed air in the rotor chamber 12a to the outside, and second shaft seal devices 32 for preventing intrusion of the lubricating oil into the rotor chamber 12a.

As illustrated in FIG. 1, the first shaft seal device 30 and the second shaft seal device 32 in a tubular shape capable of being fitted on the shaft 14b of the male screw rotor 14 are disposed between the bearing 24 and the rotor chamber 12a, whereas the first shaft seal device 30 and the second shaft seal device 32 in a tubular shape capable of being fitted on the shaft 14c of the male screw rotor 14 are disposed between the bearing 26 and the rotor chamber 12a. In addition, the first shaft seal devices 30 are disposed on the rotor chamber 12a side of the second shaft seal devices 32.

From here, the detail of the first shaft seal device 30 and the second shaft seal device 32 will be described. It should be noted that the first shaft seal device 30 and the second shaft seal device 32 fitted on the shaft 14b of the male screw rotor 14 is substantially the same as the first shaft seal device 30 and the second shaft seal device 32 fitted on the shaft 14c of the male screw rotor 14. Thus, hereinafter, the screw compressor 10 will be described by focusing on the first shaft seal device 30 and the second shaft seal device 32 fitted on the shaft 14c of the male screw rotor 14 (on the timing gear 20 side of the male screw rotor 14).

Figure 3:
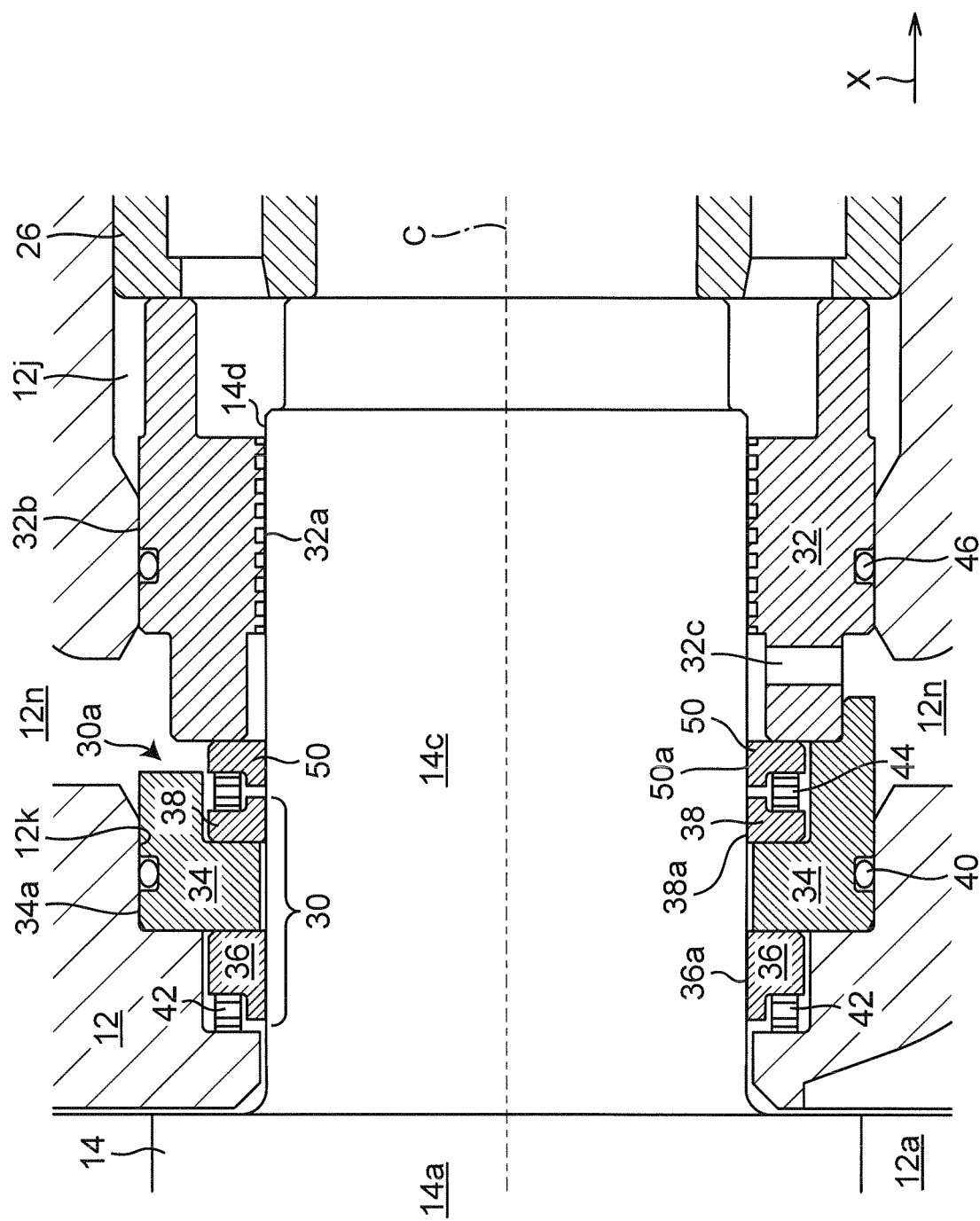
FIG. 3 is a partial enlarged view of FIG. 1.

FIG. 3 is a partial enlarged view of FIG. 1, and illustrates the first shaft seal device 30 and the second shaft seal device 32 in a state where they are fitted on the shaft 14c of the male screw rotor 14 on the timing gear 20 side. In addition, FIG. 4 illustrates the first shaft seal device 30 and the second shaft seal device 32 in a state where they are removed from the shaft 14c.

Figure 4:
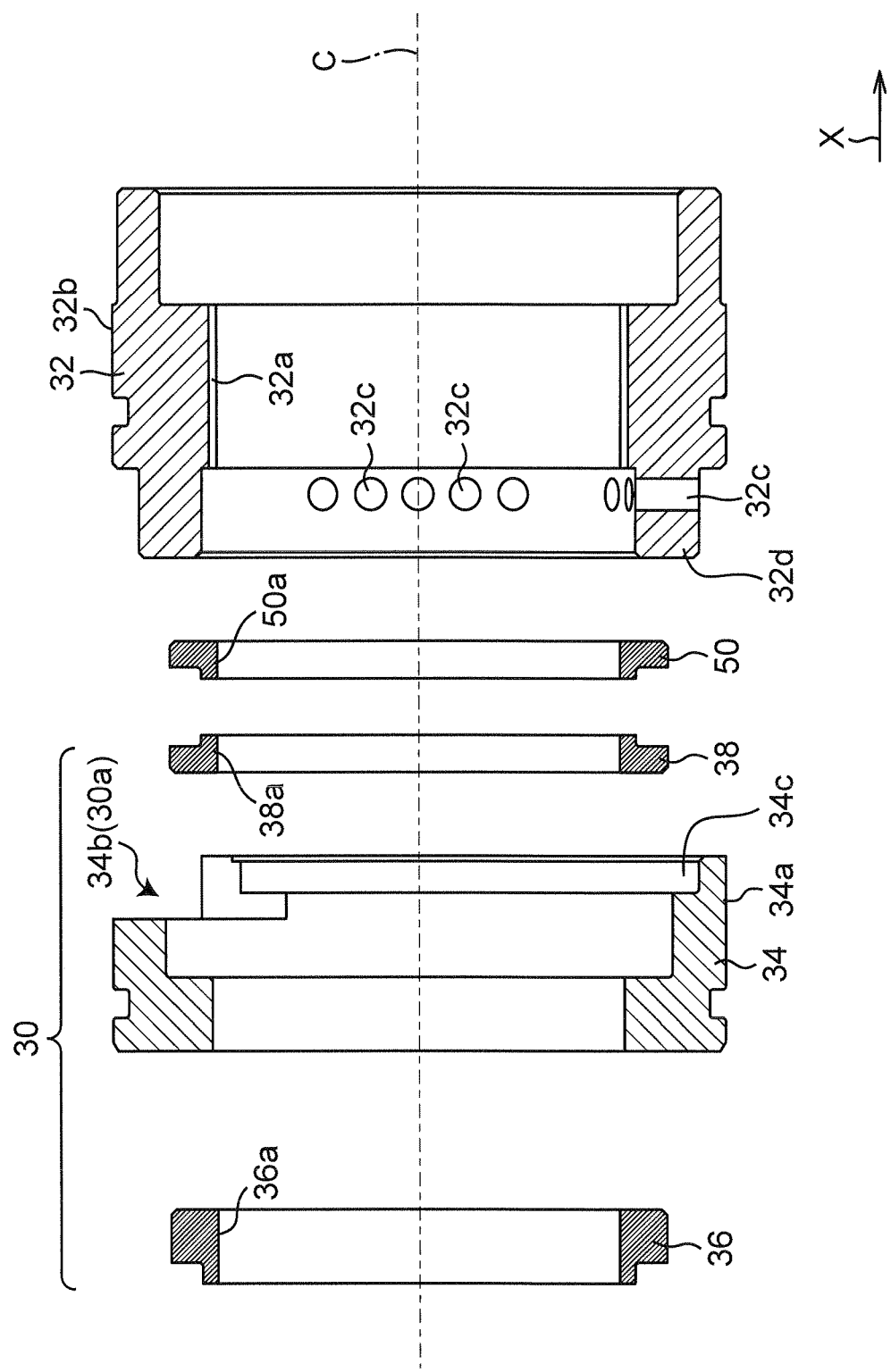
FIG. 4 is an exploded sectional view of a first shaft seal device and a second shaft seal device.

As illustrated in FIGS. 3 and 4, in the present embodiment, the first shaft seal device 30 includes a tubular main body 34, and two seal rings 36 and 38.

As illustrated in FIG. 3, the tubular main body 34 of the first shaft seal device 30 is fitted on the shaft 14c of the male screw rotor 14. In addition, the main body 34 includes an outer peripheral face 34a opposite to an inner peripheral face 12k of the shaft accommodation space 12j of the casing 12. Further, an annular resilient member 40 (e.g., O-ring) is fitted on the outer peripheral face 34a of the main body 34 in order to seal between the inner peripheral face 12k of the shaft accommodation space 12j and the outer peripheral face 34a.

The two seal rings 36 and 38 are fitted on the shaft 14c of the male screw rotor 14. In addition, the seal ring 36 includes, on its inner peripheral face, a seal 36a (first seal) opposite to an outer peripheral face 14d of the shaft 14c, and the seal ring 38 includes, on its inner peripheral face, a seal 38a (first seal) opposite to the outer peripheral face 14d of the shaft 14c. For instance, the seals 36a and 38a are seal faces. The seal 36a seals between the seal ring 36 and the outer peripheral face 14d of the shaft 14c, and the seal 38a seals between the seal ring 38 and the outer peripheral face 14d of the shaft 14c.

As illustrated in FIG. 3, the main body 34 of the first shaft seal device 30 is disposed between the two seal rings 36 and 38. To maintain the contact between the seal rings 36 and 38 and the main body 34, the seal ring 36 is biased toward the main body 34 by a biasing member 42 (second biasing member), and the seal ring 38 is biased toward the main body 34 by a biasing member 44 (first biasing member). The biasing member 42 is disposed between the casing 12 and the seal ring 36, and the biasing member 44 is disposed between the seal ring 38 and the second shaft seal device 32. The biasing members 42 and 44 are, for example, wave springs. This seals between the main body 34 and the seal rings 36 and 38.

The first shaft seal device 30 prevents leakage of compressed air in the rotor chamber 12a into the shaft accommodation space 12j, and the compressed air in the rotor chamber 12a flows via the discharging flow passage 12d toward the discharge port 12e.

As illustrated in FIGS. 3 and 4, in the present embodiment, the second shaft seal device 32 is a tubular member having an integrated configuration, and can be fitted on the shaft 14c of the male screw rotor 14. The second shaft seal device 32 in a tubular shape also includes, on its inner peripheral face, a seal 32a (second seal) opposite to the outer peripheral face 14d of the shaft 14c. In the present embodiment, the seal 32a is a visco seal. The second shaft seal device 32 further includes an outer peripheral face 32b opposite to the inner peripheral face 12k of the shaft accommodation space 12j of the casing 12. On the outer peripheral face 32b, an annular resilient member 46 for sealing between the inner peripheral face 12k of the shaft accommodation space 12j and the outer peripheral face 32b (for example, O-ring) is attached.

The second shaft seal device 32 prevents intrusion of lubricating oil that has been supplied via the lubricating flow passage 12g to the bearings 26 and 28, into the rotor chamber 12a, as illustrated in FIG. 1.

In addition to use of the first shaft seal device 30 and the second shaft seal device 32, in the screw compressor 10, leakage of compressed air from the rotor chamber 12a and intrusion of lubricating oil into the rotor chamber 12a are prevented more effectively.

For instance, when the male screw rotor 14 (and the female screw rotor 16) rotates at high speed, there is a possibility that compressed air in the rotor chamber 12a passes through between the first shaft seal device 30 and the shaft 14b that is rotating at high speed and through between the first shaft seal device 30 and the shaft 14c that is rotating at high speed. In addition, for instance, when the screw compressor 10 is in an unload operation, that is, when flow of air into the suction port 12c is limited, the rotor chamber 12a has a negative pressure therein, and as a result, there is a possibility that lubricating oil in the bearings 22 and 24 passes through between the second shaft seal device 32 and the shaft 14b and then passes through between the first shaft seal device 30 and the shaft 14b to intrude into the rotor chamber 12a, whereas there is a possibility that lubricating oil in the bearings 26 and 28 passes through between the second shaft seal device 32 and the shaft 14c and then passes through between the first shaft seal device 30 and the shaft 14c to intrude into the rotor chamber 12a.

In consideration of these possibilities, in this embodiment, in the screw compressor 10, compressed air that has passed through between the first shaft seal device 30 and the male screw rotor 14 and lubricating oil that has passed through between the second shaft seal device 32 and the male screw rotor 14 are discharged to the outside of the casing 12.

For that, as illustrated in FIG. 3, the first shaft seal device 30 includes a communication section 30a (first communication section) communicating the portion of the inner peripheral face thereof on the bearing 26 side with respect to the seal 38a and the outer peripheral face thereof. In addition, the second shaft seal device 32 includes a communication section 32c (second communication section) communicating the portion of the inner peripheral face thereof on the screw 14a side with respect to the seal 32a and the outer peripheral face thereof.

Figure 5:
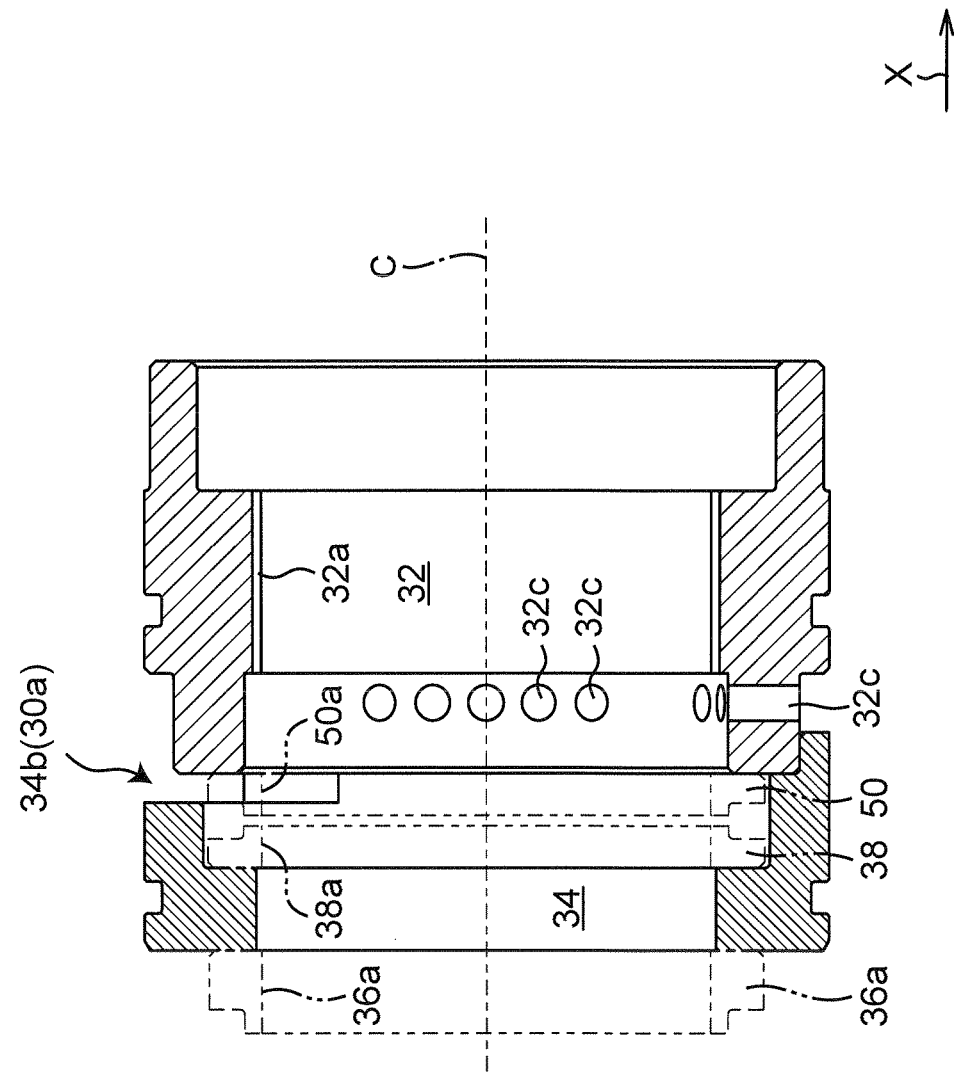
FIG. 5 is a cross-sectional view illustrating the engaged state of the first shaft seal device and the second shaft seal device.

Specifically, in the present embodiment, as illustrated in FIG. 5, the first shaft seal device 30 and the second shaft seal device 32 in a tubular shape are disposed so as to engage with each other in the extension direction (X-axis direction) of rotation center line C of the male screw rotor 14. For instance, as illustrated in FIG. 4, at the end of the first shaft seal device 30 on the second shaft seal device 32 side, a recess 34c with which an end 32d of the second shaft seal device 32 on the first shaft seal device 30 side engages is formed. With this, as illustrated in FIG. 5, the first shaft seal device 30 and the second shaft seal device 32 engage with each other so as to overlap with each other when seen in the diameter direction of the male screw rotor 14. It should be noted that the first shaft seal device 30 and the second shaft seal device 32 engage with each other so as not to change the angular positions thereof about rotation center line C of the male screw rotor 14.

In addition, in the present embodiment, as illustrated in FIG. 4, the communication section 30a of the first shaft seal device 30 includes a cutaway section 34b formed in the end face of the main body 34 on the bearing 26 side (on the second shaft seal device 32 side). Also referring to FIG. 5, when the first shaft seal device 30 and the second shaft seal device 32 engage with each other to configure one tubular structural body, a slot-shaped through hole is formed in the tubular structural body by the cutaway section 34b. The slot-shaped through hole functions as the communication section 30a of the first shaft seal device 30.

On the other hand, in the present embodiment, the communication section 32c of the second shaft seal device 32 includes a plurality of through holes. Specifically, the plurality of communication sections 32c penetrate from the inner peripheral face side toward the outer peripheral face side of the second shaft seal device 32 on the side of the screw 14a of the male screw rotor 14 (first shaft seal device 30 side) with respect to the seal 32a.

To communicate the communication section 30a of the first shaft seal device 30 and the plurality of communication sections 32c of the second shaft seal device 32 with the atmosphere, the casing 12 includes an atmosphere communication section 12m.

In the present embodiment, the atmosphere communication section 12m includes a connection space 12n, and external communication sections 12p and 12q. As illustrated in FIG. 3, the connection space 12n is formed in a recess shape in the inner peripheral face 12k of the shaft accommodation space 12j so as to be connected to both of the communication section 30a of the first shaft seal device 30 and the communication sections 32c of the second shaft seal device 32. As illustrated in FIG. 1, the external communication sections 12p and 12q communicate the connection space 12n with the atmosphere outside the casing 12.

In this embodiment, the connection space 12n of the atmosphere communication section 12m is a recess formed in the inner peripheral face 12k of the shaft accommodation space 12j so as to extend along the outer periphery of the first shaft seal device 30 and the outer periphery of the second shaft seal device 32 in the periphery direction thereof and to be connected to both of the communication section 30a of the first shaft seal device 30 and the communication sections 32c of the second shaft seal device 32.

In the present embodiment, as illustrated in FIG. 2, the connection space 12n of the atmosphere communication section 12m of the casing 12 connected to the communication section 30a of the first shaft seal device 30 and the communication sections 32c of the second shaft seal device 32 (hatched portions) fitted on the male screw rotor 14 is integrated with the connection space 12n of the atmosphere communication section 12m of the casing 12 connected to the communication section 30a of the first shaft seal device 30 and the communication sections 32c of the second shaft seal device 32 (hatched portions) fitted on the female screw rotor 16, thereby forming one sharing space 12r. Specifically, the male screw rotor 14 and the female screw rotor 16 are disposed in the casing 12 so that rotation center lines C thereof are aligned diagonally with respect to the horizontal direction (X-Y plane). Then, the connection space 12n of the male screw rotor 14 is diagonally coupled to the connection space 12n of the female screw rotor 16, thereby forming the one sharing space 12r.

In the present embodiment, the external communication section 12p of the atmosphere communication section 12m of the casing 12 is a through hole, and although the detail thereof will be described later, the external communication section 12p mainly discharges, to the outside of the casing 12, compressed air that has passed through the communication section 30a of the first shaft seal device 30 and has then flown into the connection space 12n (sharing space 12r).

In the present embodiment, the external communication section 12q of the atmosphere communication section 12m of the casing 12 is a through hole, and although the detail thereof will be described later, the external communication section 12q mainly discharges, to the outside of the casing 12, compressed air that has passed through the communication section 30a of the first shaft seal device 30 and has then flown into the connection space 12n (sharing space 12r). In addition, the external communication section 12q discharges, to the outside of the casing 12, lubricating oil that has passed through the communication sections 32c when the seal 32a of the second shaft seal device 32 is damaged due to foreign substance biting and has then flown into the connection space 12n (sharing space 12r). For that, the external communication section 12q extends diagonally downward from the lower portion of the connection space 12n (sharing space 12r).

With this configuration, compressed air in the rotor chamber 12a that has passed through between the two seal rings 36 and 38 (seals 36a and 38a) of the first shaft seal device 30 and the shaft 14c of the male screw rotor 14 mainly flows via the communication section 30a of the first shaft seal device 30 into the connection space 12n (sharing space 12r) of the atmosphere communication section 12m of the casing 12. Then, the compressed air that has flown into the connection space 12n is discharged via the external communication sections 12p and 12q to the outside of the casing 12. This further prevents passing of compressed air through between the second shaft seal device 32 and the shaft 14c of the screw rotor 14 for flowing to the bearing 26 side and the bearing 28 side.

In addition, the lubricating oil having passed through the seal 32a when the seal 32a of the second shaft seal device 32 is damaged flows into the connection space 12n (sharing space 12r) of the atmosphere communication section 12m of the casing 12 via the plurality of communication sections 32c. Then, the lubricating oil that has flown into the connection space 12n is discharged via the external communication section 12q on the lower side to the outside of the casing 12. This prevents lubricating oil from passing through between the first shaft seal device 30 and the shaft 14b of the screw rotor 14 and through between the first shaft seal device 30 and the shaft 14c of the screw rotor 14 to intrude into the rotor chamber 12a.

Lubricating oil that has flown into the connection space 12n (sharing space 12r) of the atmosphere communication section 12m of the casing 12 is collected into an oil collection section 12s in the lower portion in the connection space 12n (sharing space 12r) by its own weight with time, and is then discharged from the oil collection section 12s via the external communication section 12q extending diagonally downward to the outside of the casing 12. This can prevent intrusion of the lubricating oil into the rotor chamber 12a without immersing the shafts 14b and 14c of the male screw rotor in the lubricating oil collected in the connection space 12n.

In addition, as illustrated in FIG. 2, the angular position of the communication section 30a of the first shaft seal device 30 with respect to rotation center line C of the male screw rotor 14 is preferably different from the angular positions of the communication sections 32c of the second shaft seal device 32 with respect to rotation center line C of the male screw rotor 14. In particular, the communication section 30a of the first shaft seal device 30 is preferably provided so as to be higher than the communication sections 32c of the second shaft seal device 32.

Unlike this, when the angular position of the communication section 30a of the first shaft seal device 30 and the angular positions of the communication sections 32c of the second shaft seal device 32 are the same, that is, when these overlap with each other when seen in the extension direction of rotation center line C of the male screw rotor 14, there is a possibility that lubricating oil that has passed through between the second shaft seal device 32 and the shaft 14c intrudes into between the first shaft seal device 30 and the shaft 14c.

Specifically, lubricating oil that has passed through the seal 32a when the seal 32a of the second shaft seal device 32 is damaged flows via the communication sections 32c into the connection space 12n (sharing space 12r). During the load operation, the lubricating oil that has flown into the connection space 12n is discharged via the external communication section 12q to the outside of the casing. On the other hand, by a negative pressure that has generated in the rotor chamber 12a after the start of the unload operation of the screw compressor 10, the atmosphere that has flown from the outside of the casing into the connection space 12n (sharing space 12r) flows via the communication section 30a of the first shaft seal device 30 to the rotor chamber 12a side.

When the communication section 30a of the first shaft seal device 30 and the communication sections 32c of the second shaft seal device 32 are close to each other at this time, lubricating oil that has just flown into the connection space 12n is drawn toward flow of the atmosphere flowing via the communication section 30a of the first shaft seal device 30 to the rotor chamber 12a side so that the lubricating oil intrudes into between the first shaft seal device 30 and the shaft 14c. As a result, there is a possibility that the lubricating oil intrudes into the rotor chamber 12a.

To prevent intrusion of the lubricating oil into the rotor chamber 12a in this state, the angular position of the communication section 30a of the first shaft seal device 30 with respect to rotation center line C of the male screw rotor 14 (each of the shafts 14b and 14c) is different from the angular positions of the communication sections 32c of the second shaft seal device 32 with respect to rotation center line C of the male screw rotor 14 (each of the shafts 14b and 14c), so that the communication section 30a of the first shaft seal device 30 is separated from the communication sections 32c of the second shaft seal device 32.

In particular, when the communication section 30a of the first shaft seal device 30 is higher than the communication sections 32c of the second shaft seal device 32, this can prevent drawing of lubricating oil toward flow of the atmosphere flowing from the connection space 12n (sharing space 12r) into the communication section 30a by the own weight of the lubricating oil. As compared with a case that the communication section 30a of the first shaft seal device 30 is lower than the communication sections 32c of the second shaft seal device 32, the possibility of flow of the lubricating oil into the rotor chamber 12a is low.

Furthermore, as shown in FIG. 3, a further seal ring 50 (first seal member) is provided in order to further prevent intrusion of the lubricating oil into the rotor chamber 12a.

In the case of the present embodiment, as shown in FIG. 3, the seal ring 50 is fitted on the shaft 14c of the male screw rotor 14 so as to be movable in the extending direction of the rotation center line C of the male screw rotor 14. The seal ring 50 also includes an annular seal 50a for separating both communication sections being opposite to the shaft 14c between the first communication section 30a of the first shaft seal device 30 and the communication section 32c of the second shaft seal device 32.

In addition, the seal ring 50 is assembled in a non-contact state with the shaft 14c, and is biased in the extending direction of the rotation center line C of the male screw rotor 14 toward the second shaft seal device 32 by the biasing member 44. Thus, the seal ring 50 is clamped in the extending direction of the rotation center line C with the biasing member 44 and the second shaft seal device 32 in a state capable of following the displacement in the diameter direction of the shaft 14c with respect to the shaft 14c. In other words, the seal ring 50 normally is not in contact with anything other than the biasing member 44 and the second shaft seal device 32, and is in a floating state freely displaceable with an external force in the diameter direction of the shaft 14c of the male screw rotor 14. That is, the seal ring 50 forms a floating-type seal. It should be noted that in the case of the present embodiment, the biasing member 44 is disposed between the seal ring 50 and the seal ring 38 of the first shaft seal device 30, and biases the seal rings 50 and 38 in a direction to separate from each other.

When, for example, the seal 32a of the second shaft seal device 32 is damaged, and lubricating oil passes through the seal 32a, the lubricating oil enters the communication section 32c of the second shaft seal device 32 and is finally discharged to the outside of the screw compressor 10. Even if the lubricating oil exceeds the communication section 32c, the seal ring 50 prevents the lubricating oil from intruding into the rotor chamber 12a.

In addition, even if the screw rotor 14 is minutely displaced (minutely rattled) due to an internal gap (that is, play) of the bearings 22, 24, 26, and 28, since the seal ring 50 is freely movable in the diameter direction of the shaft 14c, the seal ring 50 does not come into strong contact with the displaced screw rotor 14. That is, the seal ring 50 can escape from the displaced screw rotor 14 (that is, release the external force from the screw rotor 14). Therefore, regardless of how the screw rotor 14 is displaced, the sealed state between the seal ring 50 and the shaft 14c does not substantially change.

Furthermore, as shown in FIG. 3, the flow passage sectional area in the communication section 30a of the first shaft seal device 30 is larger than the flow passage sectional area between the seal 50a of the seal ring 50 and the shaft 14c of the male screw rotor 14. In particular, the flow passage sectional area in the communication section 30a of the first shaft seal device 30 is preferably sufficiently large.

Specifically, in the case of the present embodiment, the sectional area (flow passage sectional area) of the slot-shaped communication section 30a of the first shaft seal device 30 as shown in FIG. 5 is preferably sufficiently larger than the sectional area (flow passage sectional area) of the annular gap between the seal 50a of the seal ring 50 and the shaft 14c of the male screw rotor 14 as shown in FIG. 3. Its reason will be described.

If the sectional area of the communication section 30a of the first shaft seal device 30 is smaller than the sectional area of the gap between the seal 50a of the seal ring 50 and the shaft 14c of the male screw rotor 14, the atmosphere flowing from the outside of the casing through the atmosphere communication section 12m by unload operation flows into the communication section 32c of the second shaft seal device 32, not the communication section 30a of the first shaft seal device 30, and then passes between the seal ring 50 and the shaft 14c to go toward the rotor chamber 12a. As a result, a negative pressure is generated between the seal 32a of the second shaft seal device 32 and the shaft 14c, and the negative pressure attracts the lubricating oil into between the seal 32a and the shaft 14c. There is a possibility that the attracted lubricating oil is induced to be accompanied by the air passing from the communication section 32c through between the seal ring 50 and the shaft 14c toward the rotor chamber 12a and finally intrudes into the rotor chamber 12a.

To prevent intrusion of the lubricating oil into the rotor chamber 12a in this aspect, the flow passage sectional area of the communication section 30a of the first shaft seal device 30 is sufficiently larger than the flow passage sectional area between the seal 50a of the seal ring 50 and the shaft 14c of the male screw rotor 14. Thereby, the atmosphere flowing from the outside of the casing via the atmosphere communication section 12m passes through the communication section 30a of the first shaft seal device 30 having a relatively large flow passage sectional area to flow into the rotor chamber 12a. Therefore, the atmosphere flowing from the outside of the casing via the atmosphere communication section 12m can be prevented from passing between the seal ring 50 having a relatively small flow passage sectional area and the shaft 14c. As a result, the lubricating oil can be prevented from intruding into the rotor chamber 12a.

In addition, since the seal ring 50 is in a state freely displaceable (that is, in a floating state) in the diameter direction of the shaft 14c of the male screw rotor 14, the flow passage sectional area in the communication section 30a of the first shaft seal device 30 can be reduced as compared with the case where a seal ring fixed in the diameter direction of the shaft 14c is used. This will be specifically described.

Assume that a seal whose position is completely fixed in the diameter direction of the shaft 14c of the male screw rotor 14 is used. For example, consider an annular seal that is inserted into the shaft accommodation space 12j so that its outer peripheral face abuts on the inner peripheral face 12k of the shaft accommodation space 12j of the casing 12. Alternatively, consider an annular seal fixed (or integral) to the second shaft seal device 32.

In this case, it is necessary to relatively increase the inner diameter of the seal, that is, the gap between the seal and the shaft 14c of the male screw rotor 14. More specifically, when the seal (or the second shaft seal device 32 integrated with the seal) is inserted into the shaft accommodation space 12j of the casing 12, the center axis of the inner peripheral face of the seal may be slightly inclined or misaligned within an allowable range with respect to the rotation center line C of the male screw rotor 14 due to inevitable manufacturing error (error within tolerance). Even if this inclination or misalignment occurs, the inner diameter of the seal is made relatively large with allowance so that the contact between the male screw rotor 14 and the seal can be reliably avoided.

On the other hand, since the seal ring 50 of the present embodiment is in a floating state without being inserted so that the outer peripheral face is in contact with the shaft accommodation space 12j of the casing 12, the seal ring 50 can be freely displaced in the diameter direction of the shaft 14c of the male screw rotor 14. Therefore, the inner diameter of the seal ring 50 can be made relatively small as compared with the seal in which the position is completely fixed.

Therefore, since the inner diameter of the seal ring 50 is relatively small, the flow passage sectional area in the communication section 30a of the first shaft seal device 30 can be made relatively small. That is, the flow passage sectional area in the communication section 30a of the first shaft seal device 30 can be made relatively small as compared with the flow passage sectional area of the communication section of the first shaft seal device 30 in the case of using a seal whose position is fixed in the diameter direction of the shaft 14c of the male screw rotor 14.

"The sectional area in the communication section 30a of the first shaft seal device 30 (flow passage sectional area) can be reduced" means that the size of the first shaft seal device 30 in the extending direction of the rotation center line C of the male screw rotor 14 can be reduced. Furthermore, it means that the distance between the screw 14a of the male screw rotor 14 and the bearing 26 can be shortened. In other words, as shown in FIG. 1, it means that the distance between the two bearings 24 and 26 for supporting the shafts 14c on both sides of the screw 14a can be shortened. Shortening the distance between the bearings 24 and 26 can prevent the bending of the male screw rotor 14.

In addition, the positions of the plurality of communication sections 32c of the second shaft seal device 32 are preferably different in the periphery direction when seen in the extension direction (X-axis direction) of rotation center line C of the male screw rotor 14 (each of the shafts 14b and 14c). As illustrated in FIG. 2, more preferably, the angular positions of the plurality of communication sections 32c of the second shaft seal device 32 with respect to rotation center line C of the male screw rotor 14 (each of the shafts 14b and 14c) are different.

In the present embodiment, as illustrated in FIG. 2, the plurality of communication sections 32c of the second shaft seal device 32 are divided into two groups G1 and G2. The positions of the communication sections 32c belonging to the second group G2 are different in the periphery direction from the positions of the communication sections 32c belonging to the first group G1. In addition, the communication sections 32c belonging to the second group G2 are disposed so as to be lower than the communication sections 32c belonging to the first group G1. For that, lubricating oil that has passed through the seal 32a when the seal 32a of the second shaft seal device 32 is damaged passes through the communication sections 32c belonging to the second group G2, and then flows into the connection space 12n (sharing space 12r) of the atmosphere communication section 12m of the casing 12.

At this time, the communication sections 32c belonging to the first group G1 serves to communicate the portion between the second shaft seal device 32 and the shaft 14c of the male screw rotor 14 with the atmosphere via the atmosphere communication section 12m of the casing 12. That is, the lubricating oil can be carried away to the communication sections 32c belonging to the second group G2 by the atmosphere (atmospheric pressure) introduced via the communication sections 32c belonging to the group G1. As a result, the lubricating oil between the second shaft seal device 32 and the male screw rotor 14 can smoothly flow into the atmosphere communication section 12m of the casing 12 via the communication sections 32c belonging to the second group G2.

The screw compressor 10 in which the angular positions of the plurality of communication sections 32c of the second shaft seal device 32 with respect to rotation center line C of the screw rotor 14 are different includes high general-purpose properties as a secondary effect.

The screw compressor 10 illustrated in FIG. 2 is disposed so that the suction port 12c directs in the up direction (Z-axis positive direction) and that the discharge port 12e directs in the horizontal direction (Y-axis negative direction). In this state, among the plurality of communication sections 32c of the second shaft seal device 32, the communication sections 32c belonging to the first group G1 are located upwardly of the communication sections 32c belonging to the second group G2. Thus, as described above, the communication sections 32c belonging to the second group G2 serve to flow lubricating oil that has passed through the seal 32a when the seal 32a of the second shaft seal device 32 is damaged, into the atmosphere communication section 12m of the casing 12. On the other hand, the communication sections 32c belonging to the first group G1 serve to communicate the portion between the second shaft seal device 32 and the male screw rotor 14 with the atmosphere via the atmosphere communication section 12m of the casing 12.

Figure 6:
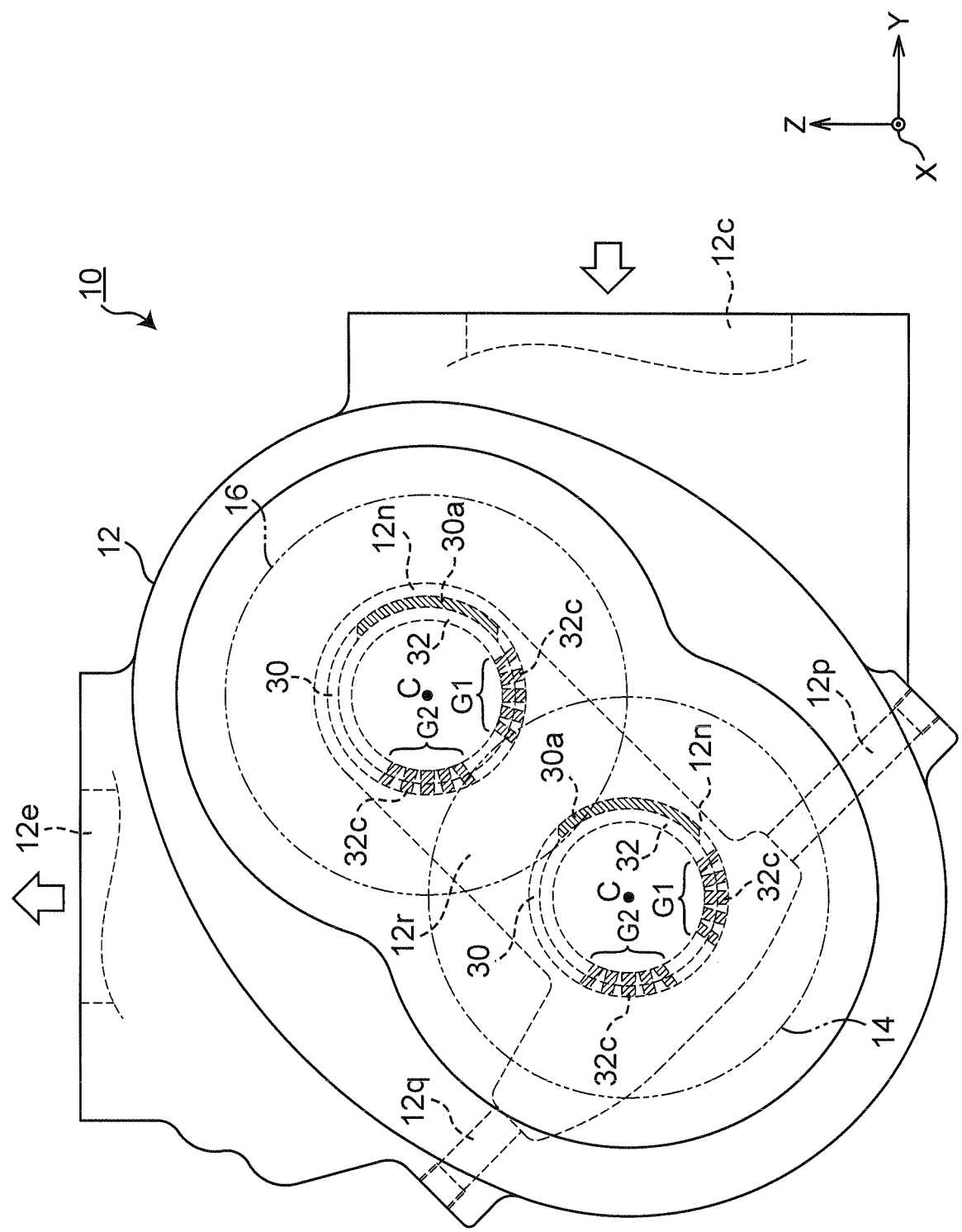
FIG. 6 is a schematic front view illustrating a state where the oil-free screw compressor in FIG. 2 is posture-changed.

FIG. 6 illustrates a state where the screw compressor 10 in FIG. 2 is posture-changed. The posture of the screw compressor 10 illustrated in FIG. 6 is the posture of the screw compressor 10 that has been rotated 90 degrees about the rotation center line extending in parallel with rotation center line C of the male screw rotor 14, from the posture illustrated in FIG. 2. The posture shown in FIG. 6 is a posture rotated clockwise around the X axis in FIG. 2.

When the screw compressor 10 takes the posture illustrated in FIG. 6, the suction port 12c directs in the horizontal direction (Y-axis positive direction), and the discharge port 12e directs in the up direction (Z-axis positive direction). In this state, among the plurality of communication sections 32c of the second shaft seal device 32, the communication sections 32c belonging to the second group G2 are located upwardly of the communication sections 32c belonging to the first group G1. Thus, the communication sections 32c belonging to the first group G1 serve to flow lubricating oil that has passed through the seal 32a when the seal 32a of the second shaft seal device 32 is damaged, into the atmosphere communication section 12m of the casing 12. On the other hand, the communication sections 32c belonging to the second group G2 serve to communicate the portion between the second shaft seal device 32 and the male screw rotor 14 with the atmosphere via the atmosphere communication section 12m of the casing 12. In addition, since the communication section 30a is located upwardly of the communication sections 32c belonging to the first group G1, it is possible to prevent drawing of lubricating oil that has flown from the communication sections 32c belonging to the first group G1 into the atmosphere communication section 12m of the casing 12 toward flow of the atmosphere flowing into the communication section 30a.

By changing the roles of the communication sections 32c belonging to the first group G1 and the second group G2 of the second shaft seal device 32 in this manner, the screw compressor 10 can be posture-changed even when re-assembling by replacing the shaft seal device or by changing the angular position is not carried out. This allows the screw compressor 10 to include high general-purpose properties.

As illustrated in FIGS. 2 and 6, after the screw compressor 10 is posture-changed, the first shaft seal device 30 fitted on each of the male screw rotor 14 and the female screw rotor 16 may be rotated about rotation center line C of each of the screw rotors 14 and 16 by e.g., a manual operation by the operator so that the communication section 30a directs in the up direction.

Figure 7:
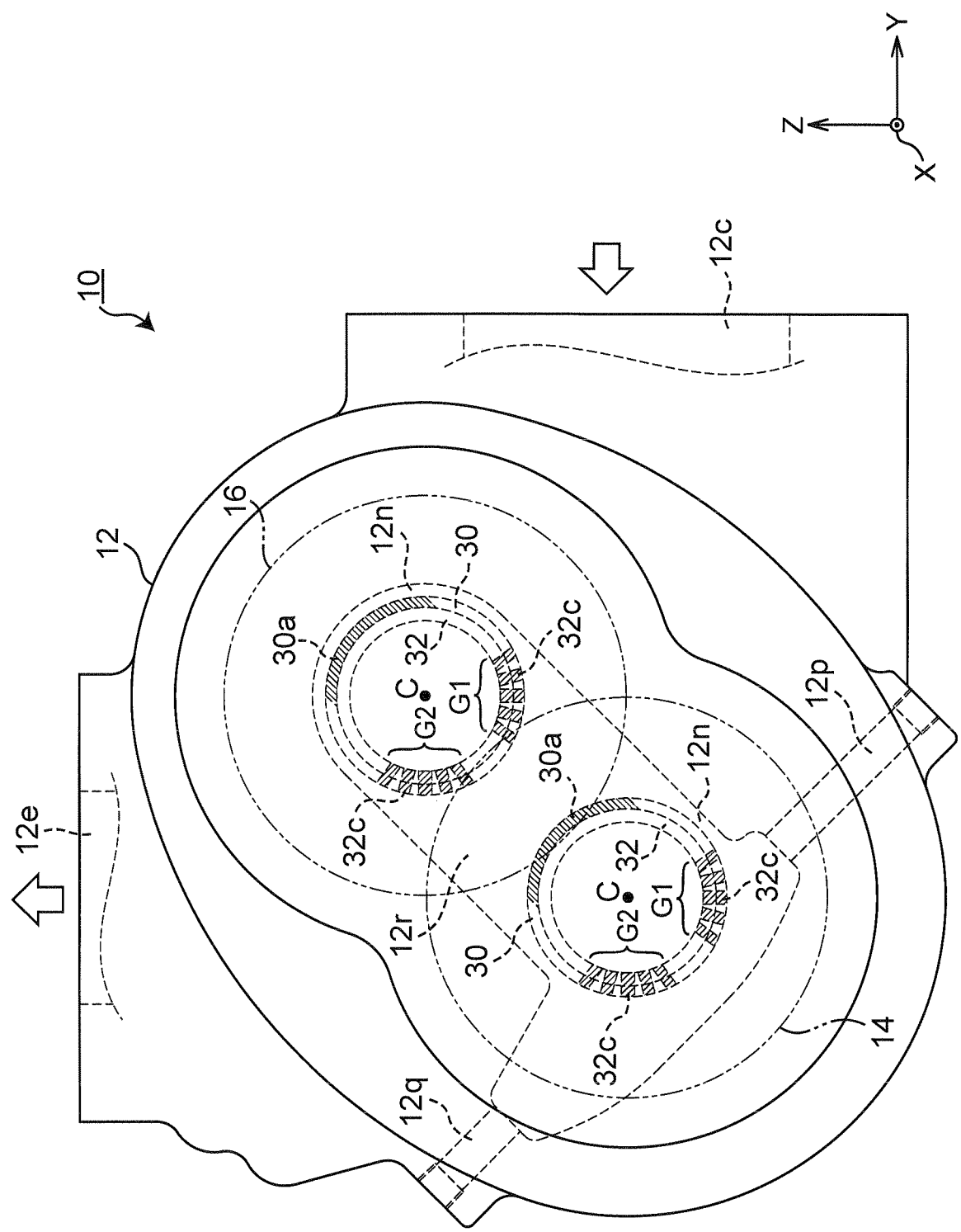
FIG. 7 is a schematic front view of the oil-free screw compressor in which the relative position of the communication section of the first shaft seal device with respect to the communication section of the second shaft seal device is different with respect to the oil-free screw compressor illustrated in FIGS. 2 and 6.

Alternatively, as illustrated in FIG. 7, the first shaft seal device 30 of each of the two screw rotors 14 and 16 may be fitted on each of the screw rotors 14 and 16 so that the communication section 30a is opposite to between the communication sections 32c belonging to the first group G1 and the communication sections 32c belonging to the second group G2 of the second shaft seal device 32 across the rotation center line C when seen in the extension direction (X-axis direction) of rotation center line C. This can omit the manual operation by the operator who rotates the first shaft seal device 30 after the screw compressor 10 is posture-changed. Further, the position relation between the communication section 30a and the communication sections 32c serving to flow lubricating oil into the atmosphere communication section 12m of the casing 12 (the communication sections belonging to the first group G1 or the second group G2) can have the same conditions even when the screw compressor 10 is posture-changed.

According to this embodiment, it is possible to provide the oil-free screw compressor 10 that can ensure sealability of the first shaft seal device 30 and the second shaft seal device 32 with respect to each of the male screw rotor 14 and the female screw rotor 16, is easy to manufacture, and can prevent bending of the male screw rotor 14 and the female screw rotor 16.

Specifically, as illustrated in FIG. 3, both of the communication section 30a of the first shaft seal device 30 and the communication sections 32c of the second shaft seal device 32 communicate with the atmosphere outside of the casing 12 via one atmosphere communication section 12m formed in the casing 12. This can easily manufacture the casing 12 as compared with a case that the atmosphere communication sections with respect to the communication section 30a of the first shaft seal device 30 and the communication sections 32c of the second shaft seal device 32 are formed in the casing 12. That is, the manufacturing of the casing 12 is easier than the manufacturing in the case of providing two separate atmosphere communication sections.

In addition, as compared with the case where respective atmosphere communication sections for the communication section 30a of the first shaft seal device 30 and the communication section 32c of the second shaft seal device 32 are provided in the casing 12, the distance between the screw 14a of the male screw rotor 14 and the bearings 24 and 26 is shortened. In other words, the distance between the two bearings 24 and 26 is shortened. As a result, the bending of the male screw rotor 14 is prevented. Similarly, the bending of the female screw rotor 16 is also prevented.

This will be specifically described. When two atmosphere communication sections with respect to the communication section 30a of the first shaft seal device 30 and the communication sections 32c of the second shaft seal device 32 are formed in the casing, the atmosphere communication sections are formed in the casing 12 so as not to interfere with each other by making their positions in the extension direction (X-axis direction) in the direction of rotation center line C of each of the screw rotors 14 and 16 different. This limits disposition of the communication section 30a of the first shaft seal device 30 and the communication sections 32c of the second shaft seal device 32, which communicate with the atmosphere communication sections, in such a manner that the communication section 30a and the communication sections 32c are close to each other in the extension direction of rotation center line C of each of the screw rotors 14 and 16. That is, the distance in the extension direction of rotation center line C between the communication section 30a of the first shaft seal device 30 and the communication sections 32c of the second shaft seal device 32 inevitably becomes long. Along with this, the distance between the screw and the bearings 24 and 26 of the screw rotors 14 and 16 inevitably becomes long. In other words, the distance between the two bearings 24 and 26 inevitably becomes long. As a result, the screw rotors 14 and 16 are likely to bend.

Thus, both of the communication section 30a of the first shaft seal device 30 and the communication sections 32c of the second shaft seal device 32 communicate with one atmosphere communication section 12m formed in the casing 12, so that the distance between the communication section 30a of the first shaft seal device 30 and the communication sections 32c of the second shaft seal device 32 can be short.

In addition, in this embodiment, as illustrated in FIG. 5, the first shaft seal device 30 and the second shaft seal device 32 engage with each other so as to partially overlap with each other when seen in the diameter direction of the male screw rotor 14. In addition, since the seal ring 50 is disposed in the first shaft seal device 30, when seen in the diameter direction of the male screw rotor 14, the seal ring 50 overlaps the first shaft seal device 30. This can make the distance between the communication section 30a of the first shaft seal device 30 and the communication sections 32c of the second shaft seal device 32 shorter. Here, the first shaft seal device 30 and the second shaft seal device 32 engage with each other so as to overlap with each other, so that the slot-shaped through hole is formed by the cutaway section 34b formed in the end face of the main body 34 on the bearing 26 side (on the second shaft seal device 32 side). This can make the distance between the communication section 30a of the first shaft seal device 30 and the communication sections 32c of the second shaft seal device 32 much shorter.

While the distance between the communication section 30a of the first shaft seal device 30 and the communication sections 32c of the second shaft seal device 32 can be short, the distance between the screw 14a of the male screw rotor 14 and the bearing 26 can also be short. Similarly, the distance between the screw 14a and the bearing 24 can also be shortened. That is, the distance between the bearings 24 and 26 opposite to each other across the screw 14a can be shortened. As a result, the bending of the male screw rotor 14 is prevented. Similarly, the bending of the female screw rotor 16 is also prevented.

The present invention has been described above by giving the above embodiment, but is not limited to this.

For instance, in the above embodiment, as illustrated in FIG. 3, the first shaft seal device 30 includes the main body 34 and the two seal rings 36 and 38, but the embodiment of the present invention is not limited to this. For instance, the number of seal rings is not limited to two, and like the second shaft seal device 32, the first shaft seal device may include one member.

In addition, in the above embodiment, as illustrated in FIG. 3, the second shaft seal device 32 includes one member, but the embodiment of the present invention is not limited to this. For instance, like the first shaft seal device 30, the second shaft seal device may include a plurality of members.

Furthermore, in the above embodiment, as illustrated in FIG. 5, the communication section 30a of the first shaft seal device 30 is one slot-shaped through hole (cutaway section 34b), and the communication sections 32c of the second shaft seal device 32 are a plurality of through holes, but the embodiment of the present invention is not limited to this. The shape and number of communication sections of the first shaft seal device and the second shaft seal device are not limited as long as the inner peripheral faces thereof and the outer peripheral faces thereof communicate with each other.

Furthermore, in the above embodiment, as illustrated in FIG. 2, the male screw rotor 14 and the female screw rotor 16 are accommodated in the casing 12 so as to be aligned diagonally with respect to the horizontal direction (X-Y plane), but the embodiment of the present invention is not limited to this.

Figure 8:
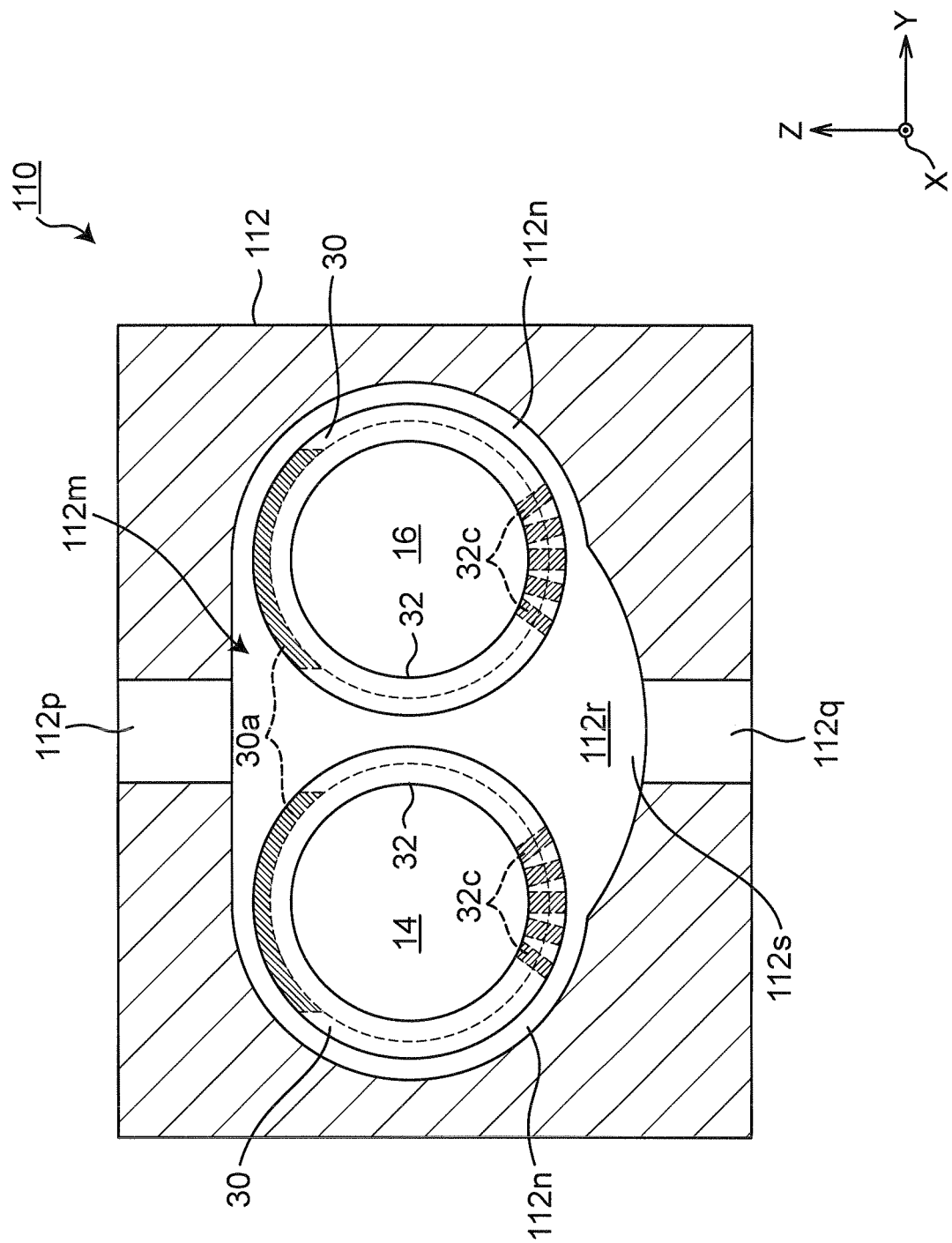
FIG. 8 is a cross-sectional view schematically illustrating the atmosphere communication section of an oil-free screw compressor according to another embodiment of the present invention.

For instance, as in a screw compressor 110 according to another embodiment schematically illustrated in FIG. 8, the male screw rotor 14 and the female screw rotor 16 may be accommodated in the casing 112 so as to be aligned in the horizontal direction (Y-axis direction).

In the embodiment illustrated in FIG. 8, a connection space 112n connected to the communication section 30a of the first shaft seal device 30 and the communication sections 32c of the second shaft seal device 32 fitted on the male screw rotor 14 is coupled in the horizontal direction to the connection space 112n connected to the communication section 30a of the first shaft seal device 30 and the communication sections 32c of the second shaft seal device 32 fitted on the female screw rotor 16, thereby forming a sharing space 112r.

In addition, an external communication section 112p communicating upward from the upper portion of the sharing space 112r toward the outside of a casing 112 and an external communication section 112q communicating downward from the lower portion of the sharing space 112r toward the outside of the casing 112 are formed in the casing 112. In addition, an oil collection section 112s is provided between the connection spaces 112n (that is, the sharing space 112r) and the external communication section 112q on the lower side.

In addition, in the above embodiment, the atmosphere communication section 12m of the casing 12 includes the two external communication sections 12p and 12q, but the embodiment of the present invention is not limited to this.

Figure 9:
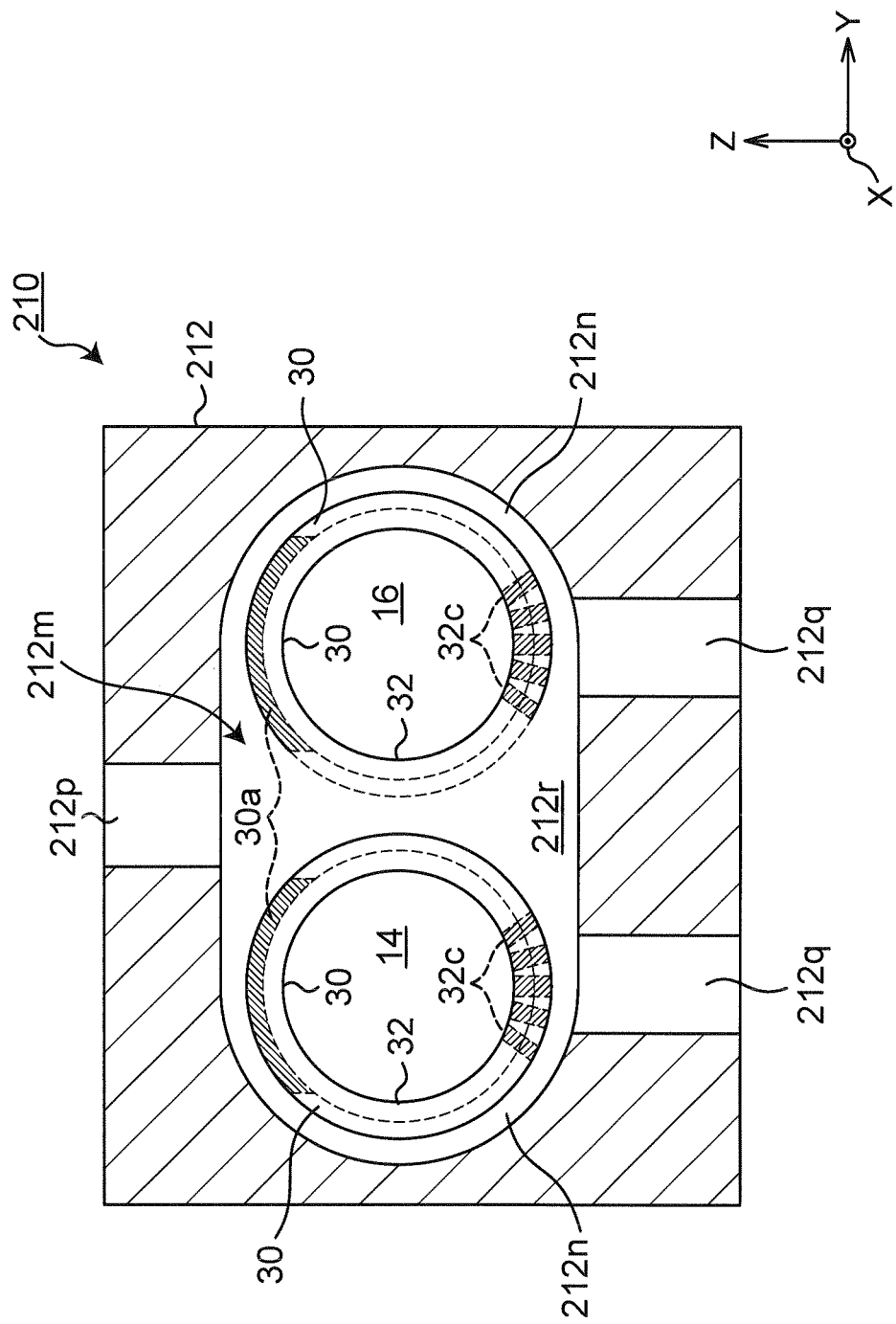
FIG. 9 is a cross-sectional view schematically illustrating the atmosphere communication section of an oil-free screw compressor according to still another embodiment of the present invention.

For instance, like a screw compressor 210 according to a further embodiment schematically illustrated in FIG. 9, three external communication sections 212p and 212q may be formed in a casing 212.

As illustrated in FIG. 9, one external communication section 212p communicates upward from the upper portion of connection spaces 212n (sharing space 212r) toward the outside of the casing 212, and two external communication sections 212q communicate downward from the lower portion of the connection spaces 212n (sharing space 212r) toward the outside of the casing 212. One of the external communication sections 212q is disposed below the communication sections 32c of the second shaft seal device 32 fitted on the male screw rotor 14. The other external communication section 212q is disposed below the communication sections 32c of the second shaft seal device 32 fitted on the female screw rotor 16. Thus, lubricating oil that has passed through the communication sections 32c of the second shaft seal device 32 flows into the external communication sections 212q directly and smoothly, and is then discharged to the outside of the casing 212. As a result, the oil collection section temporarily collecting the lubricating oil can be omitted.

In the above embodiment, as illustrated in FIG. 2, the atmosphere communication section 12m of the casing 12 includes the external communication section 12p extending in the up direction (diagonally upward), and the external communication section 12q extending in the down direction (diagonally downward), but the extension directions of the external communication sections are not limited to these. The external communication sections may extend in the horizontal direction.

Figure 10:
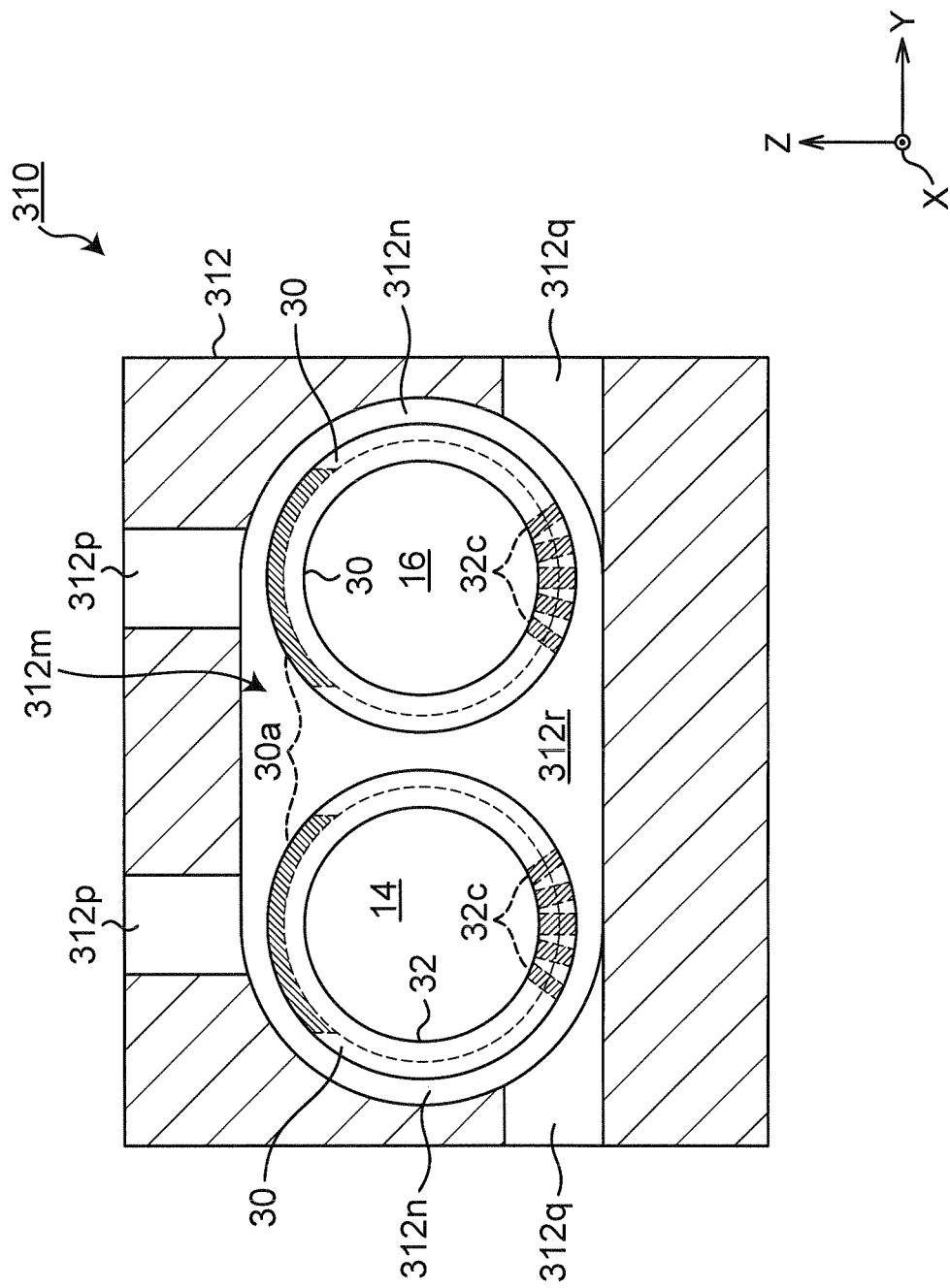
FIG. 10 is a cross-sectional view schematically illustrating the atmosphere communication section of an oil-free screw compressor according to a different embodiment of the present invention.

For instance, as in an oil-free screw compressor 310 according to a different embodiment schematically illustrated in FIG. 10, among a plurality of external communication sections 312p and 312q, the external communication sections 312q extend in the horizontal direction. In the embodiment illustrated in FIG. 10, the external communication sections 312q on the lower side, that is, the external communication sections 312q into which lubricating oil flows, extend in the horizontal direction. In this case, the bottom of a sharing space 312r of an atmosphere communication section 312m may be formed so as to extend in the horizontal direction, and may be formed so as to incline downward with respect to the external communication sections 312p.

In the above embodiment, as illustrated in FIG. 2, the connection space 12n of the atmosphere communication section 12m of the casing 12 connected to the communication section 30a of the first shaft seal device 30 and the communication sections 32c of the second shaft seal device 32 fitted on the male screw rotor 14 is integrally coupled to the connection space 12n of the atmosphere communication section 12m of the casing 12 connected to the communication section 30a of the first shaft seal device 30 and the communication sections 32c of the second shaft seal device 32 fitted on the female screw rotor 16, thereby configuring the sharing space 12r, but the embodiment of the present invention is not limited to this. The connection space 12n of the male screw rotor 14 and the connection space 12n of the female screw rotor 16 may be formed in the casing 12 without being coupled.

For instance, in the above embodiment, the screw type visco seal having a screw groove pushingly returning oil to the bearing side is illustrated as the seal 32a, but the embodiment of the present invention is not limited to this.

The seal may be a labyrinth seal when it is a non-contact seal, and may be a lip seal when it is a contact seal.

In the above embodiment, as illustrated in FIG. 2, the communication section 30a of the first shaft seal device 30 and the communication sections 32c of the second shaft seal device 32 in the male screw rotor 14 and the communication section 30a of the first shaft seal device 30 and the communication sections 32c of the second shaft seal device 32 in the female screw rotor 16 communicate with the sharing connection space 12n. Then, the connection space 12n of the male screw rotor 14 and the connection space 12n of the female screw rotor 16 communicate with each other, thereby configuring the sharing space 12r. However, the embodiment of the present invention is not limited to this.

Figure 11:
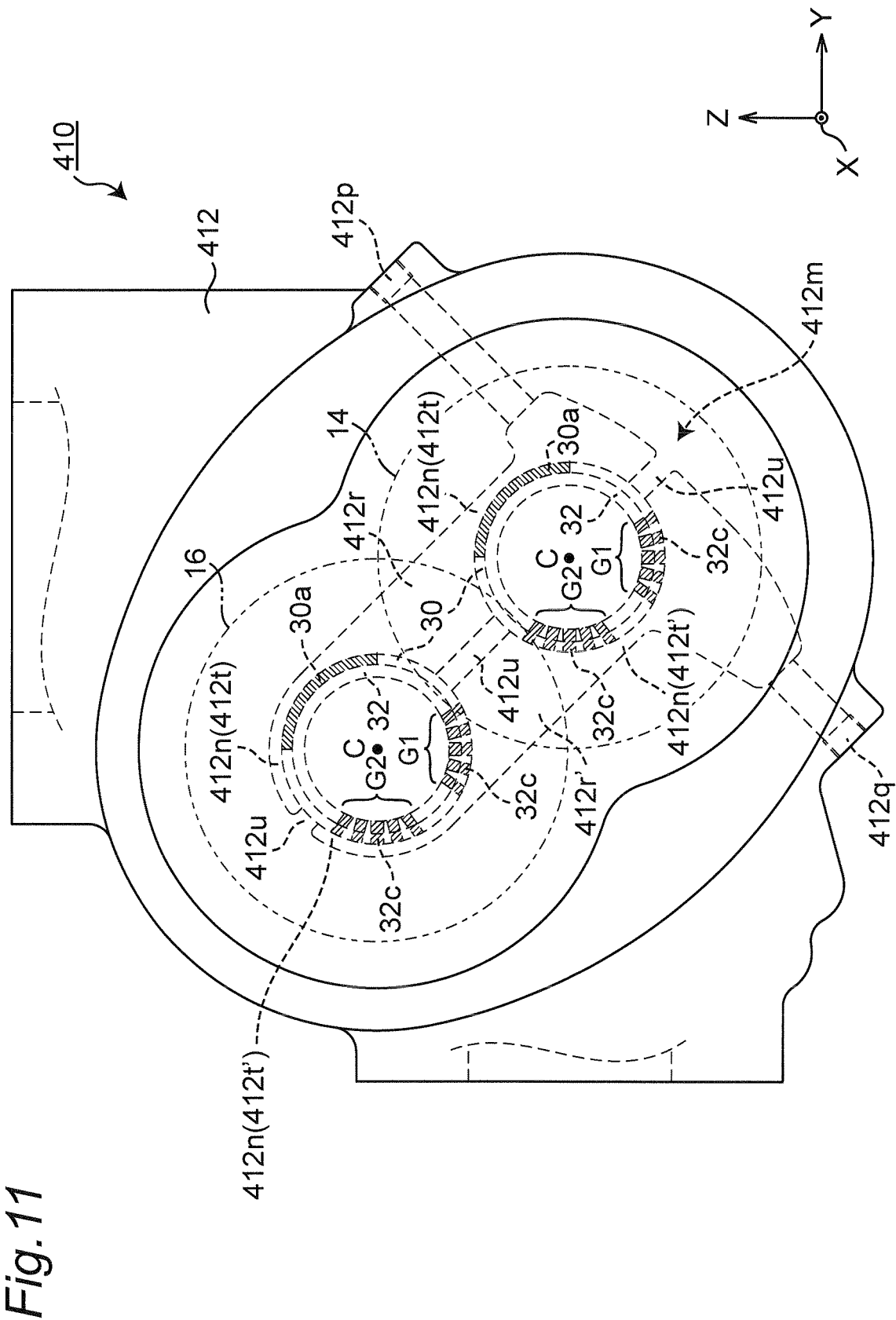
FIG. 11 is a schematic front view of an oil-free screw compressor according to a further different embodiment of the present invention.

For instance, FIG. 11 is a schematic front view of an oil-free screw compressor according to a further different embodiment of the present invention.

In an oil-free screw compressor 410 illustrated in FIG. 11, in each of the male screw rotor 14 and the female screw rotor 16, a connection space 412n is sectioned into a first sectioning region 412t and a second sectioning region 412t' by a partitioning wall 412u. The first sectioning region 412t and the second sectioning region 412t' are independent from each other, and do not communicate with each other. In addition, the first sectioning region 412t is located upwardly of the second sectioning region 412t'.

In addition, the first sectioning region 412t of the male screw rotor 14 communicates with the first sectioning region 412t of the female screw rotor 16, thereby configuring a sharing space 412r. Further, the second sectioning region 412t' of the male screw rotor 14 and the second sectioning region 412t' of the female screw rotor 16 communicate with each other, thereby configuring a sharing space 412r'.

The communication section 30a of the first shaft seal device 30 of each of the male screw rotor 14 and the female screw rotor 16 communicates with the first sectioning region 412t of the connection space 412n, but does not communicate with the second sectioning region 412t'. On the other hand, the communication sections 32c of the second shaft seal device 32 of each of the male screw rotor 14 and the female screw rotor 16 do not communicate with the first sectioning region 412t of the connection space 412n, but communicate with the second sectioning region 412t'.

As illustrated in FIG. 11, the first sectioning region 412t of the connection space 412n communicates with the outside of a casing 412 via an external communication section 412p. On the other hand, the second sectioning region 412t' communicates with the outside of the casing 412 via an external communication section 412q.

The advantages of such a configuration will be described by taking the first shaft seal device 30 and the second shaft seal device 32 fitted on the shaft 14c of the male screw rotor 14, as an example.

When slight abnormality such as a small damage in the seal 32a and a small amount of leaked oil due to the increase in pressure in the space on the bearing side of the seal 32a is caused in the seal between the second shaft seal device 32 and the shaft 14c, lubricating oil in the bearing 26 passes through the communication sections 32c of the second shaft seal device 32 to enter the second sectioning region 412f of the connection space 412n, and then flows to the outside of the casing 412 via the external communication section 412q communicating therewith.

On the other hand, when significant abnormality such as a large amount of leaked oil due to a large damage in the seal is caused in the seal between the second shaft seal device 32 and the shaft 14c, lubricating oil in the bearing 26 passes between the seal 50a of the seal ring 50 and the shaft 14c of the male screw rotor 14 to enter the first sectioning region 412t of the connection space 412n via the communication section 30a of the first shaft seal device 30 together with compressed air, and then flows to the outside of the casing 412 from the external communication section 412p communicating therewith. It should be noted that in the situation where the lubricating oil passes between the seal 50a of the seal ring 50 and the shaft 14c of the male screw rotor 14, the lubricating oil flows into the rotor chamber 12a.

Thus, by examining flow of the lubricating oil out of the external communication sections 412p and 412q, it is possible to identify the flow-out state of the lubricating oil due to the abnormality of the seal between the second shaft seal device 32 and the shaft 14c, such as whether the lubricating oil flows into the rotor chamber 12a, without disassembling the oil-free screw compressor 410.

It should be noted that the external communication section 412q corresponding to the second sectioning region 412t' is located downwardly of the external communication section 412p corresponding to the first sectioning region 412t communicating with the communication section 30a of the first shaft seal device 30 so that the lubricating oil is smoothly discharged to the outside of the casing 412. That is, the lubricating oil that has leaked out from the seal of the second shaft seal device 32 is discharged to the outside via the second sectioning region 412t' and the external communication section 412q relatively on the lower side.

Figure 12:
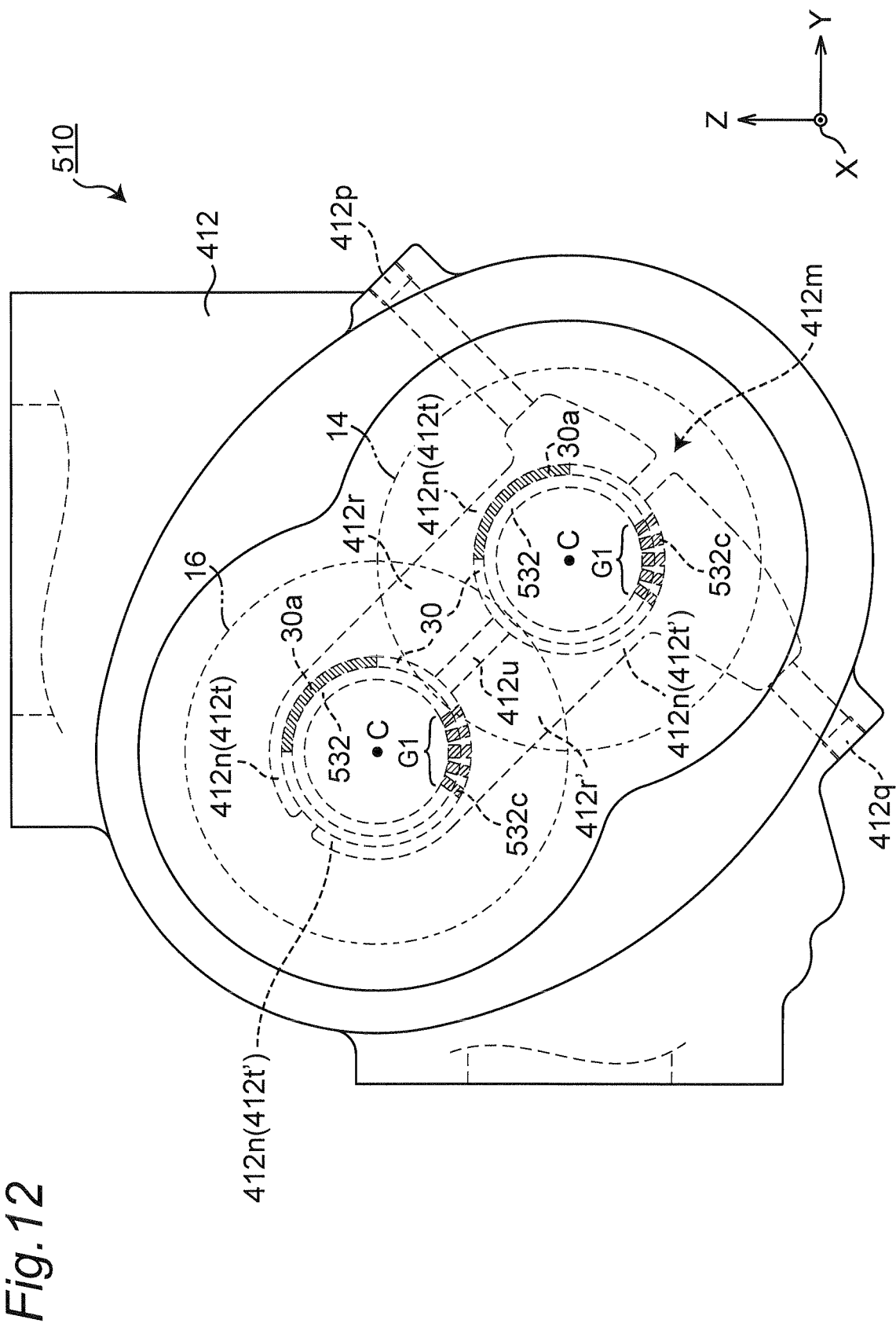
FIG. 12 is a schematic front view of an oil-free screw compressor according to a modification of the embodiment illustrated in FIG. 11.

In addition, as illustrated in FIG. 11, the plurality of communication sections 32c of the second shaft seal device 32 communicating with the second sectioning region 412t' of the connection space 412n are divided into the group G1 opened in the vertical direction (Z-axis direction) and the group G2 opened in the horizontal direction (Y-axis direction). However, the embodiment of the present invention is not limited to this. In place of this, an oil-free screw compressor 510 in a modification illustrated in FIG. 12 does not have the group opened in the horizontal direction (Y-axis direction) to which a plurality of communication sections 532c of a second shaft seal device 532 belong, but has only the group G1 opened in the vertical direction (Z-axis direction) to which the plurality of communication sections 532c of the second shaft seal device 532 belong. In this case, the processing cost for manufacturing the plurality of communication sections in the second shaft seal device can be low.

Figure 13:
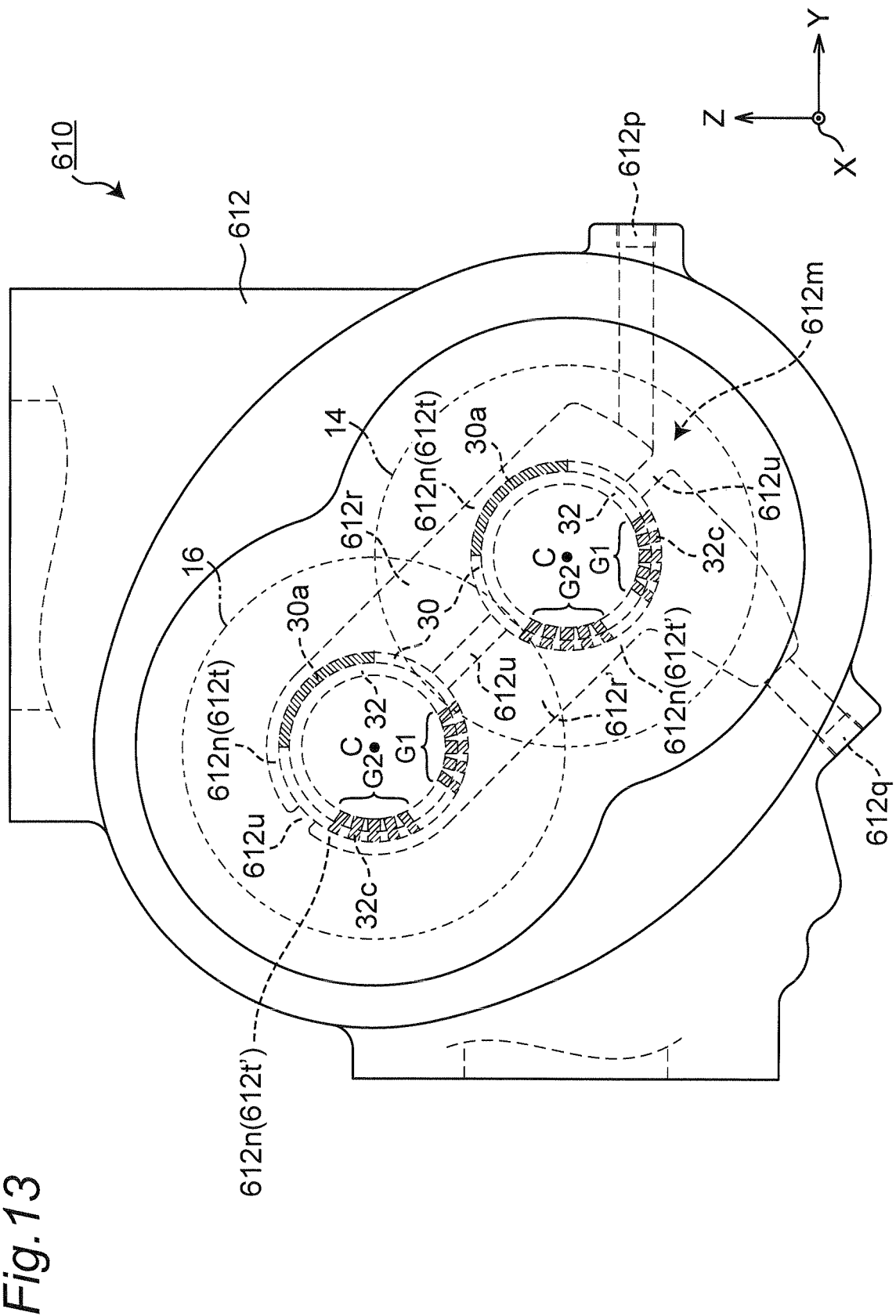
FIG. 13 is a schematic front view of an oil-free screw compressor according to another modification of the embodiment illustrated in FIG. 11.

Furthermore, as illustrated in FIG. 11, the external communication section 412p communicating with the first sectioning region 412t of the connection space 412n extends diagonally upward from the first sectioning region 412t to communicate with the outside of the casing 412. However, the embodiment of the present invention is not limited to this. In place of this, in an oil-free screw compressor 610 in another modification illustrated in FIG. 13, an external communication section 612p communicating with a first sectioning region 612t of a connection space 612n extends from the lower portion of the first sectioning region 612t (sharing space 612r) in the horizontal direction (Y-axis direction) to communicate with the outside of a casing 612. In this case, since lubricating oil in the bearing 26 that has flown into the first sectioning region 612t can be discharged to the outside of the casing 612 via the external communication section 612p at the bottom of the first sectioning region 612t, the lubricating oil is hard to be collected in the first sectioning region 612t.

Figure 14:
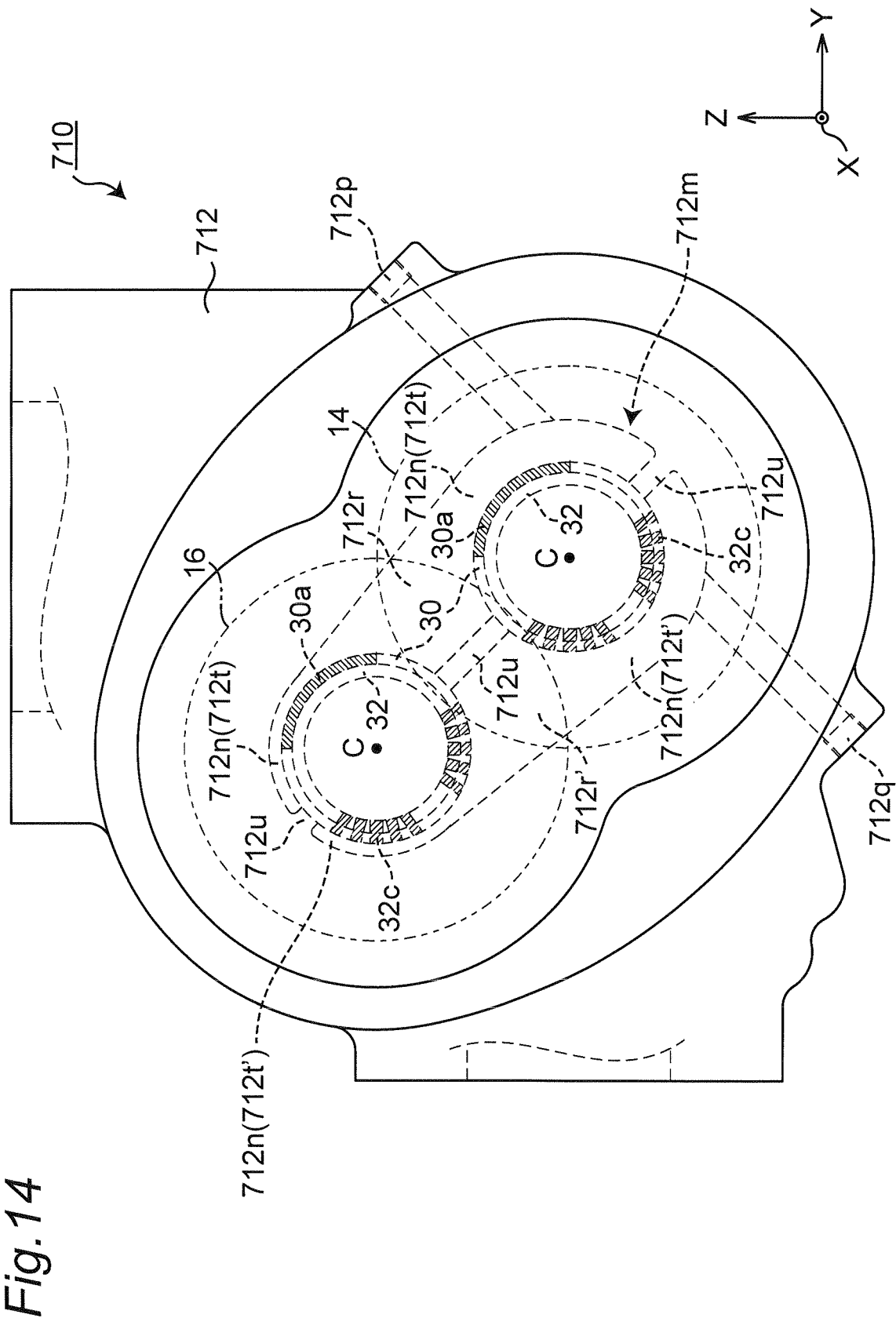
FIG. 14 is a schematic front view of an oil-free screw compressor according to a different modification of the embodiment illustrated in FIG. 11.

Furthermore, as illustrated in FIG. 11, the shapes of the first sectioning region 412t and the second sectioning region 412t' of the connection space 412n are not symmetric with respect to the partitioning wall 412u therebetween, and are different. However, the embodiment of the present invention is not limited to this. In place of this, in an oil-free screw compressor 710 in a modification illustrated in FIG. 14, a first sectioning region 712t and a second sectioning region 712f are symmetric with respect to a partitioning wall 712u therebetween. In this case, the process for forming the first sectioning region 712t and the second sectioning region 712t' in a casing 712 is simplified, thereby improving the productivity of the casing 712. In addition, the inner wall of the first sectioning region 712t located on the side close to an external communication section 712p may be gradually away from the shaft seal device as compared with the inner wall of the first sectioning region 712t located on the side far from the external communication section 712p, and the inner wall of the second sectioning region 712t' located on the side close to an external communication section 712q may be gradually away from the shaft seal device as compared with the inner wall of the second sectioning region 712t' located on the side far from the external communication section 712q. This can make flow of air smooth as compared with a case that the positions of the inner walls are not changed.

In addition, in the case of the above embodiment, as shown in FIG. 3, the seal ring 50 is disposed between the first communication section communicating with the seals (36a and 38a) of the first shaft seal device 30 and the communication section 32c of the second shaft seal device 32. The seal ring 50 prevents the intrusion of the lubricating oil into the rotor chamber. Furthermore, in order for the lubricating oil to be more reliably prevented from intruding into the rotor chamber, additional seal rings may be provided in addition to the seal ring 50. In addition, the seal ring 50 is a floating-type seal ring. Therefore, even when the shaft is displaced due to the internal gap of the bearing at the time of starting the compressor, the seal 50a of the seal ring 50 can follow the displacement. Thus, the seal ring 50 can stably exhibit the sealing performance even when the shaft is displaced due to the internal gap of the bearing.

Figure 15:
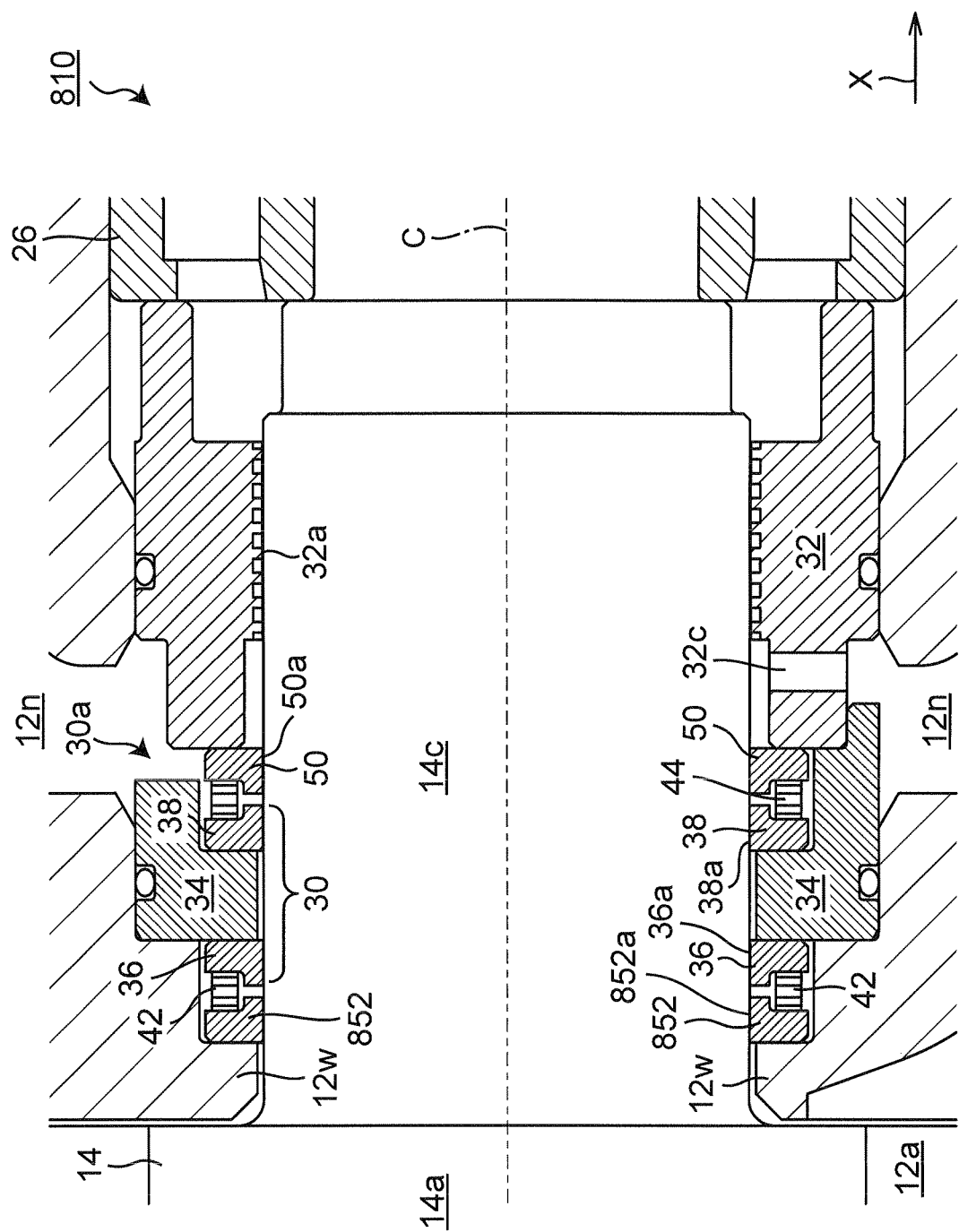
FIG. 15 is a partial sectional view of an oil-free screw compressor according to still another embodiment of the present invention.

As shown in FIG. 15, the oil-free screw compressor 810 according to still another embodiment of the present invention further includes a seal ring 852 (second seal member) in addition to the seal ring 50.

The seal ring 852 is movably fitted on the shaft 14c of the male screw rotor 14 in the extending direction of the rotation center line C of the male screw rotor 14. The seal ring 852 also includes an annular seal 852a opposed to the shaft 14c between the seals (36a and 38a) of the first shaft seal device 30 and the screw 14a of the male screw rotor 14. In addition, the seal ring 852 forms a floating-type seal 852a and is provided so as to be capable of following the displacement of the shaft 14c in the diameter direction. That is, the seal ring 852 is fitted on the shaft 14c in a state of capable of following the displacement of the shaft 14c in the diameter direction.

In addition, the seal ring 852 is assembled in a non-contact state with the shaft 14c, and is biased in the extending direction of the rotation center line C of the male screw rotor 14 toward the portion 12w of the casing 12 between the rotor chamber 12a and the first shaft seal device with the biasing member 42. The portion 12w of the casing 12 faces the root portion of the shaft 14c of the male screw rotor 14 in the diameter direction of the shaft 14c. Thus, the seal ring 852 is clamped in the extending direction of the rotation center line C with the biasing member 42 and the portion 12w of the casing 12 in a non-contact state with the shaft 14c. In other words, the seal ring 852 normally is not in contact with anything other than the biasing member 42 and the portion 12w of the casing 12 and is in a floating state freely displaceable in the diameter direction of the shaft 14c of the male screw rotor 14. It should be noted that the biasing member 44 is disposed between the seal ring 852 and the seal ring 36 of the first shaft seal device 30, and biases the seal rings 852 and 36 in a direction to separate from each other.

Similarly to the seal ring 50, the seal ring 852 can also escape from the displaced screw rotor 14 (that is, release an external force from the screw rotor 14) even when the screw rotor 14 is minutely displaced (that is, minutely rattled) due to the internal gap (that is, play) of the bearings 22, 24, 26, and 28. Therefore, regardless of how the screw rotor 14 is displaced, the sealed state between the seal ring 852 and the shaft 14c does not substantially change.

The seal ring 852, in addition to the seal ring 50, prevents deterioration (instability) of the sealing performance due to the internal gap (that is, play) of the bearings 22, 24, 26, and 28.

It should be noted that the two seal rings 36 and 38 of the first shaft seal device 30, the seal ring 50, and the seal ring 852 may have the same shape. In addition, the two biasing members 42 and 44 for biasing these seal rings may have the same shape. Thus, the manufacturing cost of the oil-free screw compressor can be kept low.

In addition, in the case of the above embodiment, as shown in FIG. 3, the seal ring 50 is disposed on the screw 14a (rotor chamber 12a) side of the male screw rotor 14 with respect to the second shaft seal device 32. That is, when seen in the diameter direction of the male screw rotor 14, the seal ring 50 does not overlap the second shaft seal device 32. Instead of this, the seal ring may overlap the second shaft seal device. In addition, the seal ring may overlap both the first shaft seal device 30 and the second shaft seal device 32.

Figure 16:
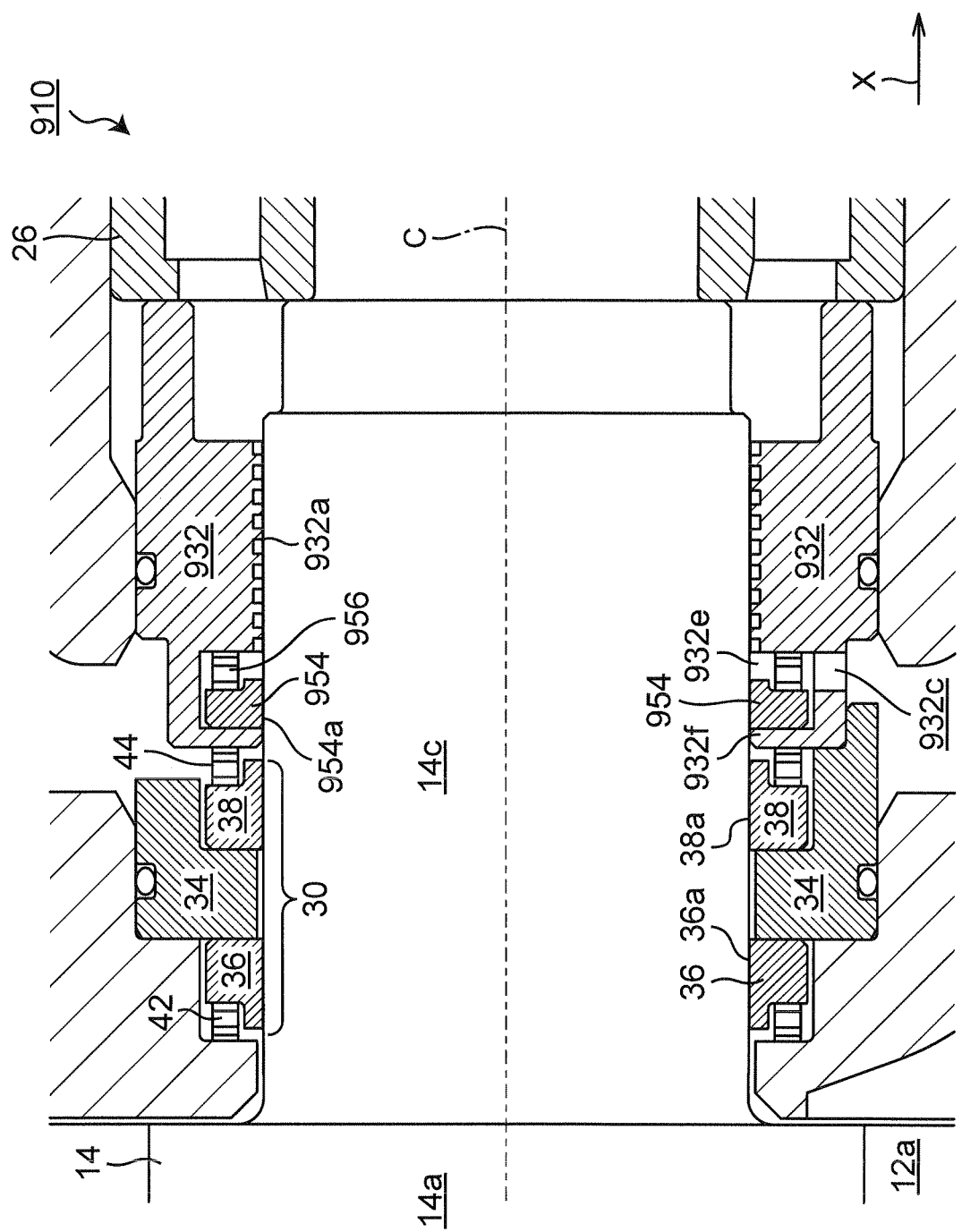
FIG. 16 is a partial sectional view of an oil-free screw compressor according to a further different embodiment of the present invention.

In a still further different embodiment of the present invention shown in FIG. 16, when seen in the diameter direction of the male screw rotor 14, the seal ring 954 (first seal member) overlaps the second shaft seal device 932. Specifically, the second shaft seal device 932 is provided with an annular groove 932e for accommodating the seal ring 954 and the biasing member 956 (first biasing member) on the inner peripheral face thereof. The seal ring 954 is fitted on the shaft 14c of the male screw rotor 14 so as to be movable in the extending direction of the rotation center line C and is accommodated in the annular groove 932e of the second shaft seal device 932. In addition, the seal ring 954 is disposed between the first communication section communicating with the seals (36a and 38a) of the first shaft seal device 30 and the communication section 932c of the second shaft seal device 932. In addition, the seal ring 954 is a floating-type seal ring. That is, the seal ring 954 is provided with a floating-type seal 954a opposed to the shaft 14c of the male screw rotor 14.

The biasing member 956 is accommodated in the annular groove 932e of the second shaft seal device 932 together with the seal ring 954. The biasing member 956 also biases the seal ring 954 toward the screw 14a (rotor chamber 12a) side of the screw rotor 14 in the extending direction of the rotation center line C. That is, the biasing member 956 biases the seal ring 954 toward the side wall on the side of the screw 14a in the annular groove 932e of the second shaft seal device 932.

As in the seal ring 50, also in this seal ring 954 overlapping the second shaft seal device 932, even when the shaft is displaced due to the internal gap (that is, play) of the bearings 22, 24, 26, and 28 at the start of the compressor, the seal 954a of the seal ring 954 can follow the displacement. Thus, the seal ring 954 can stably exhibit the sealing performance even when the shaft is displaced due to the internal gap of the bearing.

It should be noted that if the seal of the first seal member can separate the communication section of the first shaft seal device and the communication section of the second shaft seal device, the first seal member may overlap the first shaft seal device. That is, the seal ring being the first seal member may at least partially overlap at least one of the first shaft seal device and the second shaft seal device. Overlapping in this way allows the distance between the screw of the screw rotor and the bearing to be shortened as compared with a case where the first shaft seal device, the second shaft seal device, and the seal ring are arranged without overlapping with each other. Therefore, it is possible to shorten the distance between the bearing on one side and the bearing on the other side with respect to the screw, and to prevent the bending of the screw rotor.

Finally, in the case of the above embodiments, the first seal member separating the first communication section of the first shaft seal device and the second communication section of the second shaft seal device includes an annular seal, and is a floating-type seal ring biased in the extending direction of the rotation center line C of the male screw rotor toward the second shaft seal device with the biasing member, but the embodiments of the present invention are not limited thereto. That is, in a broader sense, the first seal member only has to include an annular seal separating the first communication section and the second communication section, only has to be assembled in a non-contact state with the shaft of the screw rotor, and only has to be provided so as to allow an external force from the shaft to be released. That is, the first seal member only has to be substantially capable of following minute displacement due to the internal gap of the bearing. Then, the first seal member only has to be configured such that a flow passage sectional area in the first communication section of the first shaft seal device is larger than the flow passage sectional area between the seal of the first seal member and the shaft of the screw rotor (that is, as small a flow passage sectional area between the seal and the shaft as possible).

As illustration of the technique in this disclosure, various embodiments have been described above. For that, the accompanying drawings and the detailed description have been provided.

Thus, the components described in the accompanying drawings and the detailed description can include, not only the components essential for solving the problems, but also the components not essential for solving the problems, in order to illustrate the above technique. Thus, it should not be immediately identified that those non-essential components are essential since the non-essential components have been described in the accompanying drawings and the detailed description.

This disclosure has been sufficiently described in connection with the preferred embodiments with reference to the accompanying drawings, but various modifications and corrections are apparent for those skilled in the art. It should be understood that as long as such modifications and corrections do not depart from the scope of the present invention by the attached claims, they are included therein.

The present invention as described above is applicable to a multi-stage oil-free screw compressor.

The invention claimed is:

1. An oil-free screw compressor comprising:
   a screw rotor including a screw and a shaft;
   a bearing supporting the shaft;
   a first shaft seal device fitted on the shaft, the first shaft seal device disposed between the screw and the bearing, the first shaft seal device including:
      a first seal opposite to the shaft, and
      a first communication section configured to communicate between an inner peripheral face of the first shaft seal device on a bearing side and an outer peripheral face of the first shaft seal device on the bearing side;
   a second shaft seal device fitted on the shaft, the second shaft seal device disposed between the first shaft seal device and the bearing, the second shaft seal device including:
      a second seal opposite to the shaft, and
      a second communication section configured to communicate between an inner peripheral face of the second shaft seal device on a screw side and an outer peripheral face of the second shaft seal device on the screw side;
   a casing including a rotor chamber accommodating the screw, and a shaft accommodation space accommodating the shaft, the bearing, the first shaft seal device, and the second shaft seal device; and
   a first seal member fitted on the shaft, the first seal member including an annular seal configured to be opposite to the shaft between the first communication section and the second communication section and separate the first communication section and the second communication section,
   wherein the casing includes an atmosphere communication section connected to both of the first communication section and the second communication section on the inner peripheral face of the shaft accommodation space, the atmosphere communication section configured to communicate the first communication section and the second communication section with an atmosphere,
   wherein a flow passage sectional area in the first communication section is larger than a flow passage sectional area between the annular seal of the first seal member and the shaft, and
   wherein an angular position of the first communication section with respect to a rotation center of the shaft is different from an angular position of the second communication section, and
   wherein the atmosphere communication section includes a connection space formed in a recess shape on the inner peripheral face of the shaft accommodation space so that the connection space is connected to both of the first communication section and the second communication section whose angular positions are different.

2. The oil-free screw compressor according to claim 1, wherein the first communication section is provided in a higher position than the second communication section when the oil-free screw compressor is situated on a ground.

3. The oil-free screw compressor according to claim 1, wherein the atmosphere communication section includes an external communication section communicating a lower portion of the connection space with the atmosphere outside the casing, and an oil collection section provided between the external communication section and the connection space.

4. The oil-free screw compressor according to claim 1, wherein a connection space of the atmosphere communication section is sectioned into a first sectioning region and a second sectioning region with a partitioning wall, wherein the first communication section communicates with the first sectioning region, wherein the second communication section communicates with the second sectioning region, and wherein each of the first sectioning region and the second sectioning region includes an external communication section configured to communicate with the atmosphere outside the casing.

5. The oil-free screw compressor according to claim 4, wherein an external communication section corresponding to the second sectioning region is positioned at lower level than an external communication section corresponding to the first sectioning region when the oil-free screw compressor is situated on a ground.

6. The oil-free screw compressor according to claim 1, wherein the second communication section includes a plurality of second communication sections, and wherein angular positions of the respective plurality of second communication sections with respect to a rotation center of the shaft are different.

7. The oil-free screw compressor according to claim 1, wherein the first shaft seal device and the second shaft seal device engage with each other so as to partially overlap with each other when seen in a diameter direction of the screw rotor.

8. The oil-free screw compressor according to claim 1, wherein the first seal member is a seal ring forming a floating-type seal and is provided displaceably in a diameter direction of the shaft.

9. The oil-free screw compressor according to claim 8, further comprising a second seal member fitted on the shaft, the second seal member including an annular seal opposed to the shaft between the first seal of the first shaft seal device and the rotor chamber.

10. The oil-free screw compressor according to claim 9, wherein the second seal member is a seal ring forming a floating-type seal and is provided displaceably in a diameter direction of the shaft.

11. The oil-free screw compressor according to claim 1, wherein the first seal member overlaps at least one of the first shaft seal device and the second shaft seal device at least partially when seen in a diameter direction of the screw rotor.

* * * * *